United States Patent
van der Gast et al.

(10) Patent No.: US 8,703,475 B2
(45) Date of Patent: Apr. 22, 2014

(54) BIOREMEDIATION

(75) Inventors: Christopher John van der Gast, Oxfordshire (GB); Ian P. Thompson, Didcot (GB)

(73) Assignee: Microbial Solutions Limited (GB)

( * ) Notice: Subject to any disclaimer, the term of this patent is extended or adjusted under 35 U.S.C. 154(b) by 203 days.

(21) Appl. No.: 12/544,728

(22) Filed: Aug. 20, 2009

(65) Prior Publication Data

US 2010/0227380 A1 Sep. 9, 2010

Related U.S. Application Data

(63) Continuation of application No. PCT/GB2008/000584, filed on Feb. 20, 2008.

(30) Foreign Application Priority Data

Feb. 20, 2007 (GB) .................................... 0703271.7

(51) Int. Cl.
*B09C 1/10* (2006.01)
*C12M 1/00* (2006.01)
*C12M 3/00* (2006.01)

(52) U.S. Cl.
USPC ........................................ 435/262.5; 435/289

(58) Field of Classification Search
None
See application file for complete search history.

(56) References Cited

U.S. PATENT DOCUMENTS

| 6,719,902 | B1 * | 4/2004 | Alvarez et al. ................ 210/601 |
| 7,001,758 | B1 * | 2/2006 | Fry et al. ..................... 435/262.5 |
| 2005/0238631 | A1 * | 10/2005 | Burwell ....................... 424/93.45 |

OTHER PUBLICATIONS van der Gast et al. "Effects of pH Amendment on Metal Working Fluid Wastewater Biological Treatment Using a Defined Bacterial Consortium." Biotechnology and Bioengineering, 89(3), (2005), 357-366. This article was published online on Dec. 29, 2004 in Wiley InterScience.* van der Gast, "Temporal dynamics and degradation activity of an bacterial inoculum for treating waste metal-working fluid." Environmental Microbiology (2004) 6(3), 254-263.* van der Gast et al."Effects of pH Amendment on Metal Working Fluid Wastewater Biological Treatment Using a Defined Bacterial Consortium", Biotechnology and Bioengineering, vol. 89, No. 3, Feb. 5, 2005.* van der Gast "Temporal dynamics and degradation activity of an bacterial inoculum for treating waste metal-working fluid", Environmental Microbiology (2004) 6(3), 254-263.*

Schippers et al. "*Microbacterium oleivorans* sp. nov. and *Microbacterium hydrocarbonoxydans* sp. nov., novel crude-oil-degrading Gram positive bacteria", International Journal of Systematic and Evolutionary Microbiology (2005), 55, 655-660.*

Masaaki Morikawa, "Beneficial Biofilm Formation by Industrial Bacteria *Bacillus subtilis* and Related Species", Journal of Bioscience and Bioengineering, vol. 101, No. 1, 1-8, 2006.*

(Continued)

*Primary Examiner* — Blaine Lankford
*Assistant Examiner* — Lauren K Van Buren
(74) *Attorney, Agent, or Firm* — Schwegman, Lundberg & Woessner, P.A.

(57) ABSTRACT

The chemical oxygen demand of unprocessed, spent metal working fluids, can be reduced to levels of 2000 mg $l^{-1}$ by using a consortium of micro-organisms capable of growth in untreated semi-synthetic metal working fluids, wherein the consortium has at least four members which are selected from at least one each of *Agrobacterium* spp., *Comamonas* spp., *Methylobacterium* spp., and *Microbacterium* spp.

15 Claims, 13 Drawing Sheets

(56) References Cited

OTHER PUBLICATIONS

Verduzco-Luque et al. "Construction of biofilms with defined internal architecture using dielectrophoresis and flocculation." Biotechnology and Bioengineeering, vol. 83, No. 1, Jul. 5, 2003, pp. 39-44.*

Di Lorenzo et al. "Characterization and performance of a toluene-degrading biofilm developed on pumice stones" Microbial Cell Factories 2005, 4:4.*

International Application Serial No. PCT/GB2008/000584, International Search Report mailed May 23, 2008, 4 pgs.

International Application Serial No. PCT/GB2008/000584, Written Opinion mailed May 23, 2008, 7 pgs.

Morikawa, M., et al., "Beneficial Biofilm Formation by Industrial Bacteria *Bacillus subtilis* and Related Species", *Journal of Bioscience and Bioengineering*, 101(1), (2006), 1-8.

Muszyński, A., et al., "Biodegradation of Used Metalworking Fluids in Wastewater Treatment", *Polish Journal of Environmental Studies*, 14(1), (2005), 73-79.

Van Der Gast, C. J., et al., "Bioaugmentation Strateqies for Remediating Mixed Chemical Effluents", *Biotechnology Progress*, 19(4), (2003), 1156-1161.

Van Der Gast, C. J., et al., "Effects of pH Amendment on Metal Working Fluid Wastewater Biological Treatment Using a Definied Bacterial Consortium", *Biotechnology and Bioengineering*, 89(3), (2005), 357-366.

Van Der Gast, C. J., et al., "Identification and characterisation of bacterial populations of an in-use metal-working fluid by phenotypic and genotypic methodology", *International Biodeterioration & Biodegradation*, 47(2), (2001), 113-123.

Van Der Gast, C. J., et al., "Temporal dynamics and deqradation acttvity of an bactertal inoculum for treating waste metal-working fluid", *Environmental Microbiology*, 6(3), (2004), 254-263.

Van Der Gast, C. J., et al., "Selection of microbial consortia for treating metal-working fluids", *Journal of Industrial Microbiology & Biotechnology*, 29, (2002), 20-27.

Verduzco-Luque, C. E., et al., "Construction of Biofilms With Defined Internal Architecture Using Dielectrophoresis and Flocculation", *Biotechnology and Bioengineering*, 83(1), (2003), 39-44.

\* cited by examiner

BIOREMEDIATION

This application is a continuation under 35 U.S.C. 111(a) of PCT/GB2008/000584, filed Feb. 20, 2008 and published as WO 2008/102131 A1 on Aug. 28, 2008, which claimed priority under U.S.C. 119 to United Kingdom Application No. 0703271.7, filed Feb. 20, 2007; which applications and publication are incorporated herein by reference and made a part hereof.

The present invention relates to the use of consortia of micro-organisms in the treatment of industrial waste, to preparations of such consortia and to bioreactors and treatment systems containing them.

Metal working fluids (MWF) are an essential component of heavy manufacturing facilities (including automotive engine, transmission and stamping plants). Specifically, they are used as coolants and lubricants for metal cutting and grinding, and drilling operations. MWF wastes contribute to the vast majority of organic compounds in wastewater produced by such manufacturing plants.

MWFs are typically formulated to include chemicals that inhibit metal corrosion and microbial activity (biocides), whilst lubricating and cooling the metal cutting process. It can be an extreme environment for microbes, with a high alkalinity (pH ranging from 9 to 11) and extreme temperatures when the fluid is in use.

In the UK, 400 million liters of waste MWF are produced annually, and world-wide figures are estimated to be $22.4 \times 10^9$ liters annually [1]. Once oil-based MWFs have become operationally exhausted, they are typically treated using such steps as ultrafiltration. This established technology is used in many industries, including dyeing, food and cosmetics. High pressure cross-flow of the fluid through membrane tubes (pore sizes ranging from 0.01-0.1 µm) causes smaller molecules to permeate through the membranes and larger oil molecules to be retained [2] for disposal or subsequent processing or treatment.

Separation and concentration methods for on-site treatment have been typically applied to MWF effluents. However, increased use of modern water-miscible synthetic formulations have increased the incidence of pollution loads in the final effluent, since many of the synthetic components easily permeate through the filtration membrane. These compounds (including anti-microbial agents and other xenobiotics) can be potentially toxic to aquatic life and have caused major problems at sewage treatment works by overloading and killing micro-organisms, resulting in substantial fines for the offending company [1]. With the implementation of several European Union and US federal directives regulating effluent discharge, for example, it is becoming increasingly important for the manufacturing industry to assume greater levels of responsibility for the waste it produces [3-6], and to find alternative methods for dealing with their waste effluents.

One solution for dealing with the aqueous effluent produced is to add a biological treatment step after the initial separation treatment. However, the pore size of membranes used in ultrafiltration ($\geq 0.1$ µm) results in removal of the indigenous microbial biomass and, so, it is necessary to re-inoculate the waste with appropriate microbial communities when passing the effluent to a bioreactor. Typically, undefined communities from activated sludge have been used. Currently, bioreactors established for disposing of MWF are commonly operated using a 'black box' approach, inoculated with undefined microbial communities from sewage, a very heterogeneous and a potentially dangerous source, that may well harbour pathogens. This, combined with the necessity for pre-treatment by ultrafiltration, makes the whole process time-consuming, expensive and potentially hazardous for the environment.

Bioaugmentation with defined microbial cultures, or specialised selected strains, is controversial and is not a widely accepted technique, being viewed either as a universal solution to bioremediation problems in general, or as useless and expensive [7]. There are many examples of the successful bioaugmentation of a variety of habitats and systems, including; soil [8, 9]; groundwater [10]; and industrial wastewaters [11, 12]. Regardless of opinion, the necessary step of separation pre-treatment of spent MWF, such as by ultrafiltration, removes any indigenous microbial biomass along with the waste oil fraction from the wastewater and, so, it is necessary to re-inoculate the waste when it passes into the bioreactor system.

MWFs come in three types; synthetic, semi-synthetic, and oil-based. The first two are easier to work with, but the results from oil-based MWFs are substantially superior, generally owing to the longer chain length present in naturally occurring oils. This same property is a major disadvantage when disposing of spent MWF, and there is no known bioremediatory treatment for oil-based MWFs that does not involve physiochemical pre-treatment of the MWF to remove oil, or other lubricant, prior to micro-organisms being added.

Biotechnology Progress, 19, 1156-61, describes the use of a bacterial suspension to degrade synthetic MWF. The maximum reduction in chemical oxygen demand was only 80% after four days. In addition, the consortium identified in this paper is not able to digest semi-synthetic or oil-based MWFs.

Biotechnology and Bioengineering, 89, 3, 357-366, discloses a bacterial suspension system which is used to degrade an ultra-filtered, semi-synthetic MWF having a low chemical oxygen demand.

Journal of Industrial Microbiology and Biotechnology, 29, 20-27, describes a method for isolating microbes for potential use in the treatment of MWFs. The method comprises growing cultures on plates containing components from MWFs.

Polish Journal of Environmental Studies, 14, 1, 73-79, discloses the use of multiple micro-organisms to reduce the chemical oxygen demand of a dilute MWF. The micro-organisms are described as immobilised, but had to be replaced every three days. A reduction of COD to 2000 from a low starting point of 15000 took two weeks. This process is not practical from an industrial viewpoint, as a) the MWF has to be diluted and neutralised, b) the culture has continually to be replaced, and c) the endpoint takes too long to reach.

DETAILED DESCRIPTION OF THE INVENTION

Figure 1:
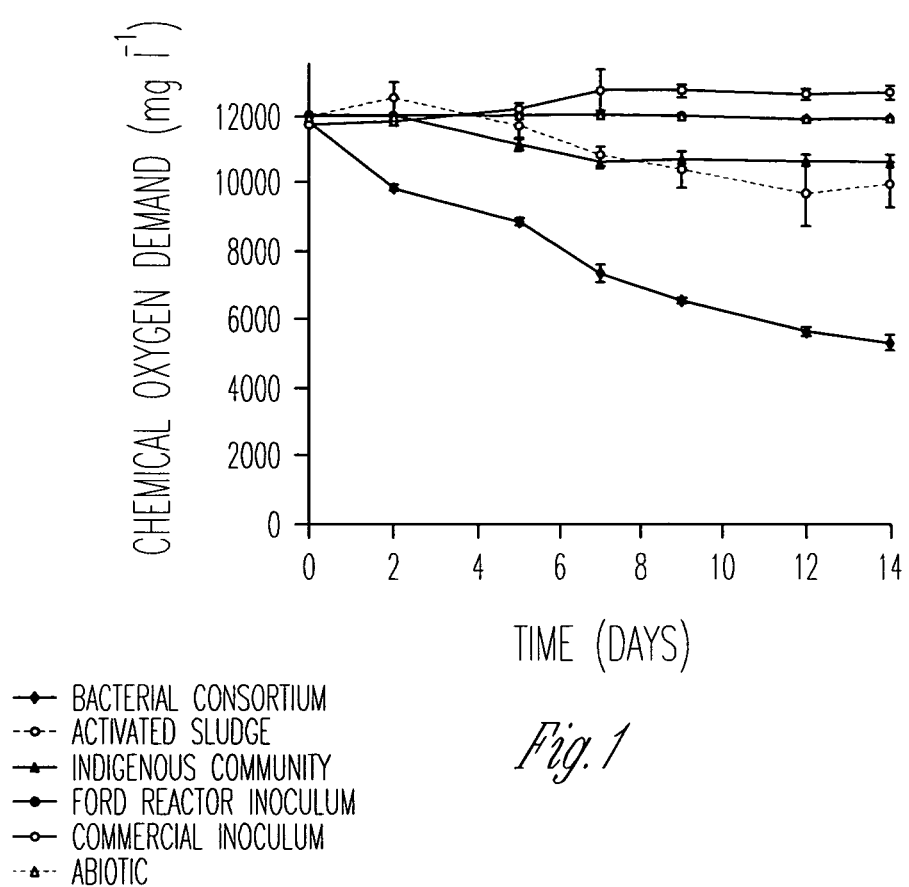
FIG. 1 shows that performance of inocula in terms of COD (pollution) decrease. Error bars represent standard deviation of the mean (n=3).

It is an object of the present invention to provide a consortium of micro-organisms that is capable of digesting untreated MWFs from all sources (synthetic, semi-synthetic, and oil-based).

Surprisingly, we have now found that micro-organisms selected from those found in association with semi-synthetic MWFs are capable of being used in the treatment of spent MWFs without any prior fractionation or separation or any other form of pre-treatment process being required.

Thus, in a first aspect, the present invention provides a method for reducing the chemical oxygen demand (COD) of unprocessed, spent metal working fluids (MWFs), comprising contacting the MWF with a consortium of micro-organisms capable of growth in untreated semi-synthetic MWFs, wherein the consortium has at least four members which are selected from at least one each of *Agrobacterium* spp., *Comamonas* spp., *Methylobacterium* spp., and *Microbacterium* spp.

Chemical oxygen demand (COD) is a measure of how much oxygen would be necessary to oxidise the components of materials such as waste effluents, and is generally considered to be a measure of the organic content of such materials. COD is measured in mg $l^{-1}$. The currently tolerated level for wastewater COD in the UK is 2000 mg $l^{-1}$, although it is probable that this level will be reduced.

As used herein, the term 'spent', as used in connection with MWFs, indicates a MWF after use. MWFs are generally provided as concentrates which must be diluted to between about 6% to 12% w/v in water prior to use. The methods of the invention are suitable to treat the diluted concentrates without further treatment, such as ultrafiltration or additional dilution steps. Indeed, it is preferred that the MWF to be treated is not ultrafiltered.

As used herein, the term 'unprocessed' indicates that the MWF has not been filtered, ultrafiltered, fractionated, separated by any other means, chemically treated, or otherwise processed subsequent to normal use and prior to contact with the consortium. The spent MWF may be treated to enhance the ability of the consortium to reduce the COD of the spent MWF, or to facilitate handling thereof, and such treatment may involve warming and/or dilution. Neutralisation by appropriate acid/alkali treatment to improve the environment for the consortium may be desirable. In general, such treatments are not necessary, and it is an advantage of the invention that spent MWFs can be used in the methods of the invention immediately after use and without any form of pre-treatment.

The consortium for use in the invention may be used in any suitable manner, and may be added direct, preferably as a culture, to the spent MWF, which may be treated with the consortium in vats, tanks or reservoirs, preferably with mechanical agitation while the COD is reduced, preferably in a manner analogous to a sewage farm. The spent MWF may also be processed together with the consortium in any other desired manner, such as by continuous processing through a series of tanks or reservoirs, or through pipes, and allowed to be released into the environment once the COD has reduced sufficiently Consortium culture may be collected from the processed MWF for re-use, if desired.

It has been found that the consortia of the present invention form a particularly effective biofilm capable of reducing COD from levels in excess of 50000 mg $l^{-1}$ to 2000 mg $l^{-1}$ or lower in a matter of days.

Thus, in a further aspect, the present invention provides a method for reducing the chemical oxygen demand (COD) of spent, preferably unprocessed, metal working fluids (MWFs), comprising contacting the MWF with a biofilm, wherein the biofilm has at least four members which are selected from at least one each of *Agrobacterium* spp., *Comamonas* spp., *Methylobacterium* spp., and *Microbacterium* spp., said biofilm being capable of growth in untreated semi-synthetic MWFs.

As used herein, 'untreated' indicates that the MWF has not been diluted, filtered, ultrafiltered, or otherwise treated after its primary use in metal working and prior to being contacted with the biofilm.

The term 'biofilm' is used herein to describe a community of micro-organisms that, together, are capable of greater COD reduction of a given MWF, and preferably all MWFs, than could be achieved by the cumulative effect of each of the family members individually. For convenience, biofilms will generally be referred to hereinunder, but it will be appreciated that this includes reference to the consortia of the invention, unless otherwise apparent from the context.

Because biofilms are communities, rather than loose associations of individual micro-organisms, they are generally able to resist perturbations of conditions such as variation in temperature, pH or pollution load. Biofilms are self-sustaining under permissive conditions, and the biofilms of the present invention are preferably selected to be self-sustaining in semi-synthetic MWF, preferably Hysol X®. Permissive conditions will also preferably involve a temperature of between 10° C. and 37° C. and/or a pH of between 6 and 9, although temperatures and pH's outside of this range will frequently be sufficient to allow growth, but this may not be as great as when these parameters are in preferred ranges. Likewise, it is preferred that the biofilms of the invention are capable of growth on all commercially available MWFs, both when the MWFs have been prepared for use and once spent. It will be appreciated that the biofilms of the invention are particularly preferred for use with spent MWFs.

Biofilms are preferably selected in accordance with their abundance across various geographical locales. It is generally not sufficient simply to select individual organisms for the rate at which they grow in a selected spent MWF but, for example, to select co-habiting organisms, some of which show only low growth in the medium, alone, and which have no great impact on degradation of the medium, as it is these which lend stability to other members of the consortium. Selection of only high growth organisms is also likely to result in the selection of pathogens, such as Enterobacter or true pseudomonads, which would be dangerous to environment once the treated MWF was released.

Preferred consortia of the invention are those which are capable of growth under punishing conditions, such as pH 9, 10° C. and a COD of between 50000 and 100000 mg l$^{-1}$.

In an alternative aspect, the present invention provides a bioreactor suitable to reduce the chemical oxygen demand (COD) of spent, preferably unprocessed, metal working fluids (MWFs), the bioreactor comprising a biofilm having at least four members which are selected from at least one each of *Agrobacterium* spp., *Comamonas* spp., *Methylobacterium* spp., and *Microbacterium* spp., said biofilm being capable of growth in untreated semi-synthetic MWFs.

In a further aspect, the present invention provides a method for reducing the chemical oxygen demand (COD) of unprocessed MWF waste, comprising contacting the MWF with a biofilm or bioreactor as defined. This aspect is particularly suitable for synthetic MWFs, as well as semi-synthetic and oil-based MWFs.

MWFs to be treated by biofilms or bioreactors of the present invention are preferably unprocessed. Treatment steps may be employed as noted herein, and may involve warming if ambient temperatures might result in sluggish catabolism from the biofilm, such as where the temperature drops below about 10° C., and/or dilution, preferably by water, to thin the sludge for better access to the bioreactor, for example.

It is a particular advantage of the present invention that the bioreactors are self-sustaining and that, barring an occurrence such as a toxic event, the biofilm does not need replacing, even after a number of batches have been treated. Indeed, as illustrated in the accompanying Examples, the efficacy of biofilms and bioreactors of the invention generally increases with time, as the biofilm stabilises and the members establish an equilibrium.

The term 'bioreactor' is used herein to describe apparatus adapted to support a biofilm of the invention and to enable the biofilm to be brought into contact with spent MWF. Such bioreactors may also be used for the treatment of any other liquid waste susceptible to degradation by the biofilms of the invention, but are primarily intended for the treatment of spent MWFs.

The bioreactor of the invention will generally comprise one or more supports for the biofilm which may form a film thereover, and wherein the support is adapted to provide a significant surface area for exposure to the MWF. The bioreactor will generally comprise a lumen or reservoir into which the MWF is introduced, with the biofilm being provided on the support throughout all, or a substantial part, of the lumen of reservoir. In either scenario, it is generally preferable to retain the MWF in the bioreactor for a period sufficient to bring the COD down to a target level. As described below, a suitable target level is 2000 mg l$^{-1}$, or less, but any suitable target value may be selected. It may also be desired to operate bioreactors in sequence, such that the MWF is either cycled through bioreactors or fed through bioreactors in sequence until a target level COD is attained.

As noted above, bioreactors of the invention may also be adapted for continuous throughput.

The precise nature of the bioreactor is not important to the present invention, and it may be desirable to use an open matrix that can be immersed into standing or slow moving MWF, for example. It will also be clear to the skilled individual that, as the biofilm grows, not only will it spread to cover the available surface within the bioreactor, but that it will also permeate the MWF, so that the treated waste will contain a substantial amount of the consortium making up the biofilm. For this reason, it is important to avoid the use of pathogens in the biofilm as far as possible.

Thus, the present invention further provides a biofilm and/or bioreactor as defined, wherein the biofilm contains substantially no pathogens, and preferably no pathogens at all.

It will be appreciated that the present invention provides the use of a bioreactor, as defined herein, in the reduction of the COD of spent MWF. The invention further provides apparatus for use as a bioreactor of the present invention and a bacterial preparation suitable to seed said apparatus to provide a bioreactor of the present invention. Further provided is waste liquid treated by a method or bioreactor of the present invention, especially where said waste is spent MWF, and more especially where the COD of the waste is 2000 mg l$^{-1}$ or lower.

The present invention also provides a method for reducing the chemical oxygen demand (COD) of spent metal working fluids (MWFs), comprising contacting the MWF with a combination of micro-organisms capable of growth in untreated semi-synthetic MWFs.

Spent MWFs are those that have been used, such as described above, and are appropriate for disposal. The method of the invention may be used on unused MWFs, but it will be appreciated that this will not normally be contemplated, as it would waste MWFs that could otherwise be used for their stated purpose.

There is also provided a method for reducing the chemical oxygen demand (COD) of an MWF intended for disposal, comprising contacting the MWF with a combination of micro-organisms capable of growth in untreated semi-synthetic MWFs.

While it is particularly preferred to use semi-synthetic and oil-based MWFs, whether they are spent or intended for disposal, the present invention is also applicable to synthetic MWFs.

The COD of oil-based MWFs, such as Shell Dromus B®, can exceed 60,000 mg l$^{-1}$. Such high levels of organic contamination have also previously been associated with the inability to use any form of bioremediation, as the high pollution load prohibits growth.

In a yet further aspect, the present invention provides a method for reducing the chemical oxygen demand (COD) of an MWF having a COD of or higher, and preferably 20,000 or higher, and most preferably even up to 95000 or 100,000 or higher, comprising contacting the MWF with a biofilm or bioreactor as defined. This aspect is particularly suitable for synthetic MWFs, as well as semi-synthetic and oil-based MWFs.

It is a particular advantage of the methods of the present invention that it is possible to reduce the COD of MWFs to below 2000 mg $l^{-1}$, and preferably to below 1000 mg $l^{-1}$, and most preferably to 500 mg $l^{-1}$ or below. In preferred embodiments, as illustrated in the accompanying Examples, this reduction is achieved in 2 days or less, under suitable conditions, as described hereinbelow.

It is a further advantage of the present invention that the methods also reduce toxicity of the MWF as measured by the *Vibrio fischeri* bioluminescence test.

The combinations of micro-organisms used in the methods of the present invention are also referred to herein as consortia, and each consortium comprises at least 4 bacteria as defined.

The micro-organisms of the consortia may typically include protozoans, bacteria and/or fungi, but excellent results have been obtained with all-bacterial consortia. Thus, members of each consortium will generally be referred to herein as bacteria, although it will be appreciated that any such reference includes reference to any suitable micro-organism, unless otherwise apparent from the context.

Preferred members of each consortium are isolated from naturally occurring MWFs obtained from geographically distinct locations. More preferred bacteria are those which occur in every sample tested, but it is preferred that the bacteria selected occur in at least a plurality of MWFs tested.

The bacteria selected for use in the methods of the present invention may be selected according to any suitable parameters, but the preferred parameters include at least degradative ability, tolerance to co-contaminants, and geographical spread.

The number of bacteria in any given consortium is not critical to the present invention, but the minimum number is four, while five is preferred.

There is no particular limit to the number of members that any consortium can have, but it is generally preferred to constitute a consortium for use in the method of the present invention from individual preparations or cultures of the members of the consortium, in order that the members do not compete in the absence of the MWF. It will be appreciated, therefore, that restricting the numbers of members will provide a logistical advantage, although there should not be less than four members.

In the accompanying Examples, five bacteria were selected to constitute a consortium. These were *Agrobacterium radiobacter, Comamonas testosterone, Methylobacterium mesophilicum, Microbacterium esteraromaticum* and *Microbacterium saperdae*. These five bacteria were deposited at the NCIMB (Bucksburn, Aberdeen, UK) on 20 Feb. 2007.

Preferred consortia comprise at least four of these bacteria, and it is particularly preferred that the consortium comprise at least one *Comamonas* sp. The invention further extends to consortia lacking one of these bacteria, but a particularly preferred consortium has all five of these bacteria present.

It is a particular advantage of the present invention that preferred consortia demonstrate synergistic effects, insofar as the growth of the consortium and toxicity reduction exceeds the growth of any strain of bacterium on its own under similar circumstances.

It will be appreciated that the bacteria for inclusion in a consortium of the present invention are selected from *Agrobacterium* spp., *Comamonas* spp., *Methylobacterium* spp., *Microbacterium* spp., and mixtures thereof. It will be appreciated that any bacterium selected should be capable of growth in the MWF for treatment in the presence of the other members of the consortium, and preferably in the absence of other members of the consortium. Preferred consortia are capable of growth in an oil-based MWF.

The methods of the present invention will generally be carried out for a time and under conditions such that the COD is reduced to a desired level. The amount of time will depend on such parameters as the nature of the MWF, the starting COD level, the temperature and the pH, but will generally be between five and twenty days. More specifically, a time of about eight to about fourteen days is often sufficient, although even 2-4 or 5, preferably 3-4 and most preferably 3 days is sufficient.

The MWF needs no treatment prior to contact with a consortium of the invention, although pre-treatments that are not excessively toxic, and preferably not at all toxic, to the biofilm may be applied if desired. After use, a waste, or spent, MWF will generally have a COD of around 100000 or less, with a preferred average around 50000-60000, and consortia of the invention have proven capable of treating such MWFs. However, it may be desirable to dilute the MWF to assist in more rapid reduction of the COD, for example, or it may be desired to dilute the treated MWF.

The methods of the present invention can be carried out over a range of pHs. MWFs often have a natural pH that is quite high, in the region of pH 9, and it has been established that the methods of the invention are optimised around about a neutral pH, with a pH of between about 6 and about 7, inclusive, being preferable.

However, another unexpected advantage of the present invention is that the methods also reduce the pH of the MWF from the normal alkaline range towards neutrality. Although not essential, this is particularly preferred when Shell Dromus® is used.

It is possible to warm the MWF during the treatment with the consortium, but this can prove expensive, and is not necessary. However, should it be desired to heat the spent MWF, then it is possible to use temperatures of up to 40° C. but preferably no higher than 37° C., but temperatures of between 10 and 30° C. are generally acceptable with an optimal temperature of about 28° C. Any temperatures outside of this range may be selected in accordance with the consortium used and the ambient conditions.

The method used to treat the MWF may be any that is suitable. For example, a preparation of the consortium may be added directly to the MWF and allowed to stand for a suitable length of time, such as two weeks. At the end of this time, a sample of the fluid can be taken in order to inoculate the next batch. The drawback with this process is that the efficacy of the consortium often tends to be reduced after a number of cycles, and further culture must be added. The process can be assisted by stirring and/or aeration. This process may be used to seed a bioreactor for example.

It is preferred to use bioreactors and, as described above, these may take any standard form. Preferred bacteria of the present invention have been found to coat standard supports without any special conditions. However, it is generally advantageous to prepare the desired consortium and then to expose the consortium to the support. It is particularly preferred to mix the consortium with growth medium, which may be the MWF when first seeding the bioreactor.

The advantage of the bioreactor is two-fold. Using the bioreactor, it has been found that the consortium retains its potency even after a number of cycles, and even appear to become substantially more effective under some circumstances, as illustrated in the accompanying Examples. Using a bioreactor also appears to substantially increase the detoxifying or de-polluting effect on the MWF, such that the reduction in COD is not only quicker, but more pronounced. A reduction to 2000 mg $l^{-1}$ can often be seen in only one or two days using a bioreactor, and this is a particular advantage of the present invention.

What is particularly surprising is that the methods of the present invention may be practiced on MWFs, particularly oil-based MWFs, that have not been fractionated or filtered or, preferably, in any other way pre-treated prior to treatment, thereby substantially reducing expense and inconvenience.

It will be appreciated that the methods of the present invention can be used for the treatment of any MWF, or any other industrial effluence of a similar nature, but that it is particularly advantageous that untreated oil-based MWFs can be treated.

It is preferred to use a bioreactor of the invention to treat oil-based MWFs, particularly an untreated and most preferably an unfiltered, oil-based MWF.

The consortia of the present invention have the advantage of being able to grow naturally in MWFs, but also being able to be used for bio-augmentation. This approach has resulted in a treatment that is capable of very substantially out-performing any other type of inoculum in terms of degradative ability. Long term bioreactor studies show that not only do the bacterial consortia of the invention persist over time, but that they also can effectively keep treating different types of metal-working fluid wastewaters (including whole oil-based fluids) at different chemical oxygen demand (pollution load) levels.

The following Examples are for illustrative purposes, and are not limiting on the invention in any way, although preferred embodiments are illustrated therein.

EXPERIMENTAL

In the accompanying Examples, five bacteria were selected to constitute a consortium. These were *Agrobacterium radiobacter* (NCIMB 41462 (5-BA-A), *Comamonas testosterone* (NCIMB 41463 (1-BTZ-0)), *Methylobacterium mesophilicum* (NCIMB 41464 (20-BTZ-N)), *Microbacterium esteraromaticum* (NCIMB 41465 (15-BTZ-N)) and *Microbacterium saperdae* (NCIMB 41466 (1-TEA-C)). These five bacteria were deposited at the NCIMB (National Collections of Industrial Food and Marine Bacteria, Bucksburn, Aberdeen, UK) on 20 Feb. 2007, under the Budapest Treaty. The letters of the codes in brackets following the Accession Numbers reflect the substrates from which the strains originated, e.g. BA, BTZ or TEA.

Each strain was grown on culture plates, and a single colony extracted and incubated over night at 28° C., before being plated out and cultured again (overnight in a static incubator at 28° C.) to ensure strain purity. The procedure was repeated as many times as necessary to confirm no other morphologies, but on average one "streak-back" procedure was sufficient. Bacteria where then harvested using aseptic techniques. 50 mg of bacterial biomass where re-suspended in a storage cryotube with 8 ml glycerol and 1 ml trypticase soy broth (tsb). Samples where then stored in a freezer at below −70° C. To raise a culture from storage, the cryotube is removed from the freezer, kept on ice, and a sterile loop used to extract the bacteria for plating out on culture plates which are incubated overnight at 28° C.

The selection of the consortium member strains was dependent on three criteria: A) degradative ability, B) tolerance to co-contaminants, and C) spatial and temporal abundance in operationally exhausted MWF as described previously [14, 15]. The main aim was to:

1) construct a degradative consortium based on the criteria outlined above;
2) test and compare the degradative performance, in lab-scale bioreactor systems under batch mode operation, of the bacterial consortium against other inocula types (detailed in the results section); and,
3) determine how to improve degradative performance of the constructed bacterial consortium by optimising reactor conditions including; a) pH amendment of the highly alkaline (pH>9) test MWF wastewater; b) free suspension long term sequence batch bioreactor operation; and, c) fixed film long term sequence batch bioreactor operation and degradative performance of the consortium against different MWF wastewaters.

The resulting data and knowledge gained from these bench scale (5 liter volume) studies was then used as a basis to develop a pilot scale reactor system (5000 liter) on an industrial site.

1. Growth and Selection of Bacterial Consortia

Bacteria were selected by undertaking a systematic selection program based on three selection criteria that reflected key features of the microbial community. These were:
1) the numerical dominance of populations within the target habitat (waste MWF);
2) tolerance to co-contaminants (MWF are chemically mixed); and
3) the ability to degrade individual chemical constituents of the MWF.

Extensive analysis of the community composition and structure of a single MWF formulation, both temporally and spatially on a world-wide scale using molecular profiling methods, were undertaken to identify the ubiquitous microbial populations in waste MWF. Subsequent screening cycles were then based on the ability of isolates to tolerate the toxicity of co-contaminants and to catabolise individual chemical constituents of the MWF.

Two bacterial consortia were assembled from;
A) Semi-synthetic, and
B) Synthetic MWFs, A) Semi-Synthetic-Hysol Consortium The MWF aqueous effluent used was primarily from a semi-synthetic fluid (Hysol X, Castrol Limited, UK) used as a coolant and lubricant in large scale continuous metal working processes. Before biological treatment, the MWF had been treated by ultra-filtration (UF), leaving a permeate containing the following main chemical constituents; benzotriazole, boron, citric acid, formaldehyde, monoethanolamine, morpholine and triethanolamine. For bioreactor studies the Hysol X permeate was filtered twice through 0.2 µm pore-size filters (35 mm diameter, Millipore, UK) to remove any potential background microbial populations that may have colonised the fluid between the UF and biological treatment steps.

The aim of this approach was to determine the effectiveness of a strategy for constructing microbial consortia for treating chemically mixed industrial effluent. Hysol X semi-synthetic MWF was chosen as the test wastewater, as it was considered to represent a particularly undesirable effluent. After three enrichment steps in minimal broth with ultrafiltered Hysol X MWF as the sole nutrient source, complementary phenotypic (culture dependent) and genotypic (culture independent) methods revealed that the microbial communities in spent MWFs had low diversity and were very similar in species composition, even though samples originated from different locations and uses. Of 300 bacterial isolates analysed, only 11 genera and 9 species were identified using culture dependent fatty acid methyl ester (FAME) analysis. The results of genotypic analysis by denaturing gradient gel electrophoresis (DGGE) were congruent with observations made using FAME analysis. The metabolic potential of the isolates was assessed in terms of assimilation ability and tolerance of co-contaminants as previously described [14].

The five isolates selected (*Agrobacterium radiobacter, Comamonas testosteroni, Methylobacterium mesophilicum, Microbacterium esteraromaticum* and *Microbacterium saperdae*) that formed the consortium were representative of the most abundant populations detected in geographically and temporally separated samples. In addition, we have surprisingly found that the combined metabolic ability of the five strains, when grown together, is greater than the sum of the individual strains when grown separately in spent ultrafiltered MWF.

Microbial Identification and Phenotypic Assessment

The phenotypic diversity and identification of individual strains isolated from MWF was determined by fatty acid methyl ester (FAME) analysis, essentially as described by Thompson et al (1993) and van der Gast et al (2001). The samples were injected into a Hewlett-Packard model 5890 series II gas chromatograph and fatty acid peaks named by the Microbial Identification System (MIS) software (Microbial ID, Newark, Del., USA) and isolates identified using the MIS 'Aerobe Library'. Similarities between isolates were calculated using a coefficient based on the Euclidean distance between pairs of isolates. Cluster analysis was performed with the MIS 'dendrogram program' using unweighted pair group method with arithmetic averages (UPGMA).

Rapid Metal Working Fluid Component Utilisation Screening

The ability of bacteria isolated from MWF to assimilate components of the fluid as sole carbon sources was assessed by inoculating each isolate into microtitre plate wells containing 100 μl M9 minimal media and 3% v/v Hysol X permeate as sole source of carbon. The master microtitre plates (containing all 300 bacterial isolates) where incubated at 28° C. overnight or until media broth became turbid. Bacteria were transferred from the master microtitre plates to flat bottom 96 well microtitre plates containing M9 minimal media and with individual synthetic MWF components (formaldehyde based biocide, benzotriazole, citric acid, formaldehyde, monoethanolamine, morpholine and triethanolamine) added at 5 mM concentration, using 200 μl tips arranged to the same pattern as the wells in the microtitre plates. The plates were covered with Seal-plate film (Sigma, Poole, UK) to prevent cross contamination or evaporation and incubated for 7 days at 28° C. Optical density was measured every 24 hours at a wavelength of 620 nm using a LUCY 1 microplate luminometer (Rosys Anthos, Switzerland). This method allowed a rapid screen of all 300 bacterial isolates for tolerance and ability to assimilate individual MWF components as the carbon source.

The consortium that was isolated consisted of five bacterial strains: *Agrobacterium radiobacter* (designated strain 5-BA-A); *Comamonas testosterone* (1-BTZ-O); *Methylobacterium mesophilicum* (20-BTZ-N); *Microbacterium esteraromaticum* (15-BTZ-N) and *Microbacterium saperdae* (1-TEA-C). These five strains met all three selection criteria, in that 1) they were ubiquitous in spatially and temporally separate samples,
2) they could degrade the chemical constituents of the MWF,
3) they were tolerant to co-contaminants.

The five strains were inoculated separately into 250 ml conical flasks containing 100 ml of tryptic soy broth (10% v/v. Difco, UK) and pre-filtered (using a 0.2 μm pore size filter, Millipore, UK) MWF wastewater (3% v/v). The individual cultures were incubated at 28° C. in an orbital shaker for 12 hours (cell counts approximated to $10^7$ cells $ml^{-1}$). The cell suspensions were removed and resuspended in MWF wastewater, mixed together and added as a 10% v/v inoculum into the bioreactors.

Inoculation Conditions

The bacterial consortium was reconstituted by inoculating the individually stored strains separately into 250 mL conical flasks containing 50 mL of tryptic soy broth (10% v/v, Difco, U.K.) and fresh MWF concentrate (3% v/v). The monocultures were then incubated at 28° C. in an orbital shaker for 12 h (cell numbers=$10^7$ cells mL-1). The cell suspensions were removed by centrifugation and resuspended in MWF effluent, mixed together, and added as a 10% v/v inoculum into the bioreactors. The activated sludge bioreactors, after centrifugation, were inoculated with 3 g of wet resuspended biomass as described above.

B) Synthetic-MEQQEM-COB

The synthetic MWF used (Castrol Limited, Pangbourne, Berks, UK) is used as a coolant and lubricant in large scale continuous metal working processes to machine tungsten carbide and steel. The fluid comprised eight main chemical constituents including a formaldehyde based biocide; benzotriazole (metal passivator); dodecanedioic acid, lauric acid, sebacic acid and amine (corrosion inhibitors); glycerol and propylene glycol (lubrication agents). It is supplied as a concentrate and is typically diluted with water to form a 6% v/v working fluid prior to use in machining operations.

Operationally exhausted synthetic MWF samples containing indigenous microbial communities were used as a source of strains from which to develop inocula. These originated from: Corby, England; Belfast, Northern Ireland; and two samples from Swindon, England, all of which had different application histories. Samples from different locations were selected in order to construct a consortium that would have wide ranging applications (e.g. varying waste MWF concentration and application). Strains capable of utilising fresh synthetic MWF as a nutrient source were enriched from four operationally exhausted MWF samples, by adding the fluids to 250 ml conical flasks containing 97 ml M9 minimal media [16], at pH 7.5 with 3 ml fresh MWF concentrate. Samples (2% v/v) of operationally exhausted MWF were added to individual flasks and incubated at 28° C. on an orbital incubator shaker at 170 rpm. After seven days, 2% v/v samples of suspension from each flask were sub-cultured into fresh media (as described above). After a further seven days, 2% v/v sub-samples from each flask were inoculated into flasks containing M9 minimal media and individual MWF components at a concentration of 5 mM. The flasks were incubated as described above, and 100 μl aliquots of the media serially diluted and 50 μl aliquots plated onto M9 minimal media agar (Agar No. 3, Oxoid UK) containing individual components at 5 mM concentration. Plates were incubated at 28° C. for three days. Following the approach of Baecker et al. (1989) [2], the highest serial dilution of samples that produced growth on plates were considered to have consisted of the most common micro-organisms in the original samples. It was from these plates that all colonies were taken and repeatedly streaked to obtain pure cultures [2]. The pure bacterial cultures were subsequently transferred onto 10% v/v tryptic soy broth plus agar (TSBA) plates (Oxoid, UK).

REFERENCES

Baecker, A. A. W., K. le Roux, and A. von Holy (1989) Microbiological contaminants of metal-working fluids in service. *S Afr J Sci.* 85:293-295. Thompson, I. P., M. J. Bailey, R. J. Ellis, and K. J. Purdy. (1993) Subgrouping of bacterial populations by cellular fatty acid composition. *FEMS Microbiol Ecol.* 102:75-84.

van der Gast, C. J., C. J. Knowles, M. A. Wright, and I. P. Thompson. (2001) Identification and characterisation of bacterial populations of an in-use metal-working fluid by phenotypic and genotypic methodology. *Int Biodet Biodeg.* 47:113-123 van der Gast, C. J., C. J. Knowles, M. Starkey, and I. P. Thompson (2002) Selection of microbial consortia for treating metal-working fluids. *J Ind Microbiol Biotechnol* 29: 20-27

2. Degradative and Nutritional Investigations

All experimental data mentioned below refers to work conducted with the consortium derived from the semi-synthetic MWF.

1. Temporal Dynamics and Degradation Activity of the Bacterial Inoculum for Treating Waste MWF.

In order for the established bioreactor systems to be effective for treating chemically mixed wastes such as MWF it was essential that they harboured microbial populations that could maintain sufficient active biomass and degrade each of the chemical constituents present. Using a worst case scenario MWF wastewater for biological treatment (a fresh semi-synthetic MWF [Hysol X, Castrol Limited] which had been ultrafiltered), we tested and compared the degradative performance of the constructed consortium against other types of inocula. All studies were performed in sealed free suspension batch operated 5 liter bioreactors (3 replicate bioreactors plus an abiotic control for each inoculum condition) where temperature and air flow were maintained at 28° C.±1° C. and 3.33 l min$^{-1}$, respectively.

The comparative inocula types included; 1. Activated sludge, a source of inocula commonly used for biological treatment of waste MWF; 2. Microbial community indigenous to operationally exhausted Hysol X MWF (pre-ultrafiltration); 3. A commercially available inoculum designed to treat oil and MWF based wastewaters; 4. Microbial communities taken from an MWF treatment system at an automotive manufacture plant (Dagenham, UK).

After 14 days operation COD was reduced by:
  Activated sludge 17%±6.7%;
  MWF indigenous community 11%±3.9%;
  The commercially available inoculum increased pollution load (COD) by
  8% from the initial COD loading of 12000 mg l–1 (FIG. 1).
  Ford reactor inoculum 1%±1.6%;
  Bacterial consortium 55%±1.7%.

FIG. 1 shows that performance of inocula in terms of COD (pollution) decrease. Error bars represent standard deviation of the mean (n=3).

Genotypic community profiling using DGGE revealed that the bacterial consortium community dynamics were stable and maintained >90% similarity between all replicate and time point samples over the 14 days operation. The MWF indigenous community dynamics were conserved but community composition shifted with time. For the remaining inocula conditions their community composition was highly divergent, where profiles differed between all time and replicate bioreactor samples. In essence, unlike the other inocula types where performance was variable, the consortium demonstrated consistent performance.

2. Optimisation of Bacterial Consortium Performance and Survival.

2a) Effects of pH Amendment on Metal Working Fluid Wastewater Biological Treatment.

The aim of this study was to investigate whether pH amendment of the highly alkaline (pH>9) metal-working fluid wastewater would improve biological treatment by the introduced constructed bacterial consortium in sealed bench-scale bioreactors. The pH ranges tested were 6, 7, 8 and 9, with three replicate batch mode bioreactors inoculated with the bacterial inoculum (plus an abiotic control bioreactor) operated for each of the four pH conditions. After 14 days, the final mean chemical oxygen demand (COD) reduction at pH 9 was 50%±1.4%; at pH 8, 58%±1.4%; pH 7, 65%±1.0%; and pH 6, 75%±2.7% of the initial COD (approximately 10000 mg l–1), respectively.

Interestingly, within 5 days the pH in all inoculated bioreactors progressed towards pH 8. However, all abiotic control bioreactors remained at the pH they were amended. The fate of the inoculum, determined by denaturing gradient gel electrophoresis (DGGE) with cluster analysis of the resulting DGGE profiles, revealed that the inocula survived throughout operation of all pH amended bioreactors. Measures of bacterial abundance were determined by total DAPI counts with microscopy. Total DAPI counts in pH 6 and 7 bioreactors increased from approximately $3\times10^7$ to $4\times10^9$ cells ml$^{-1}$. Bacterial abundance within pH 8 and pH 9 bioreactors varied little ranging from approximately $3\times10^7$ to $8\times10^7$ cells ml$^{-1}$. No cells were detected in any of the abiotic control bioreactors. Length-Heterogeneity PCR (LH-PCR) was used to track the temporal population dynamics of individual strains in all inoculated bioreactors (FIG. 2).

Figure 2:
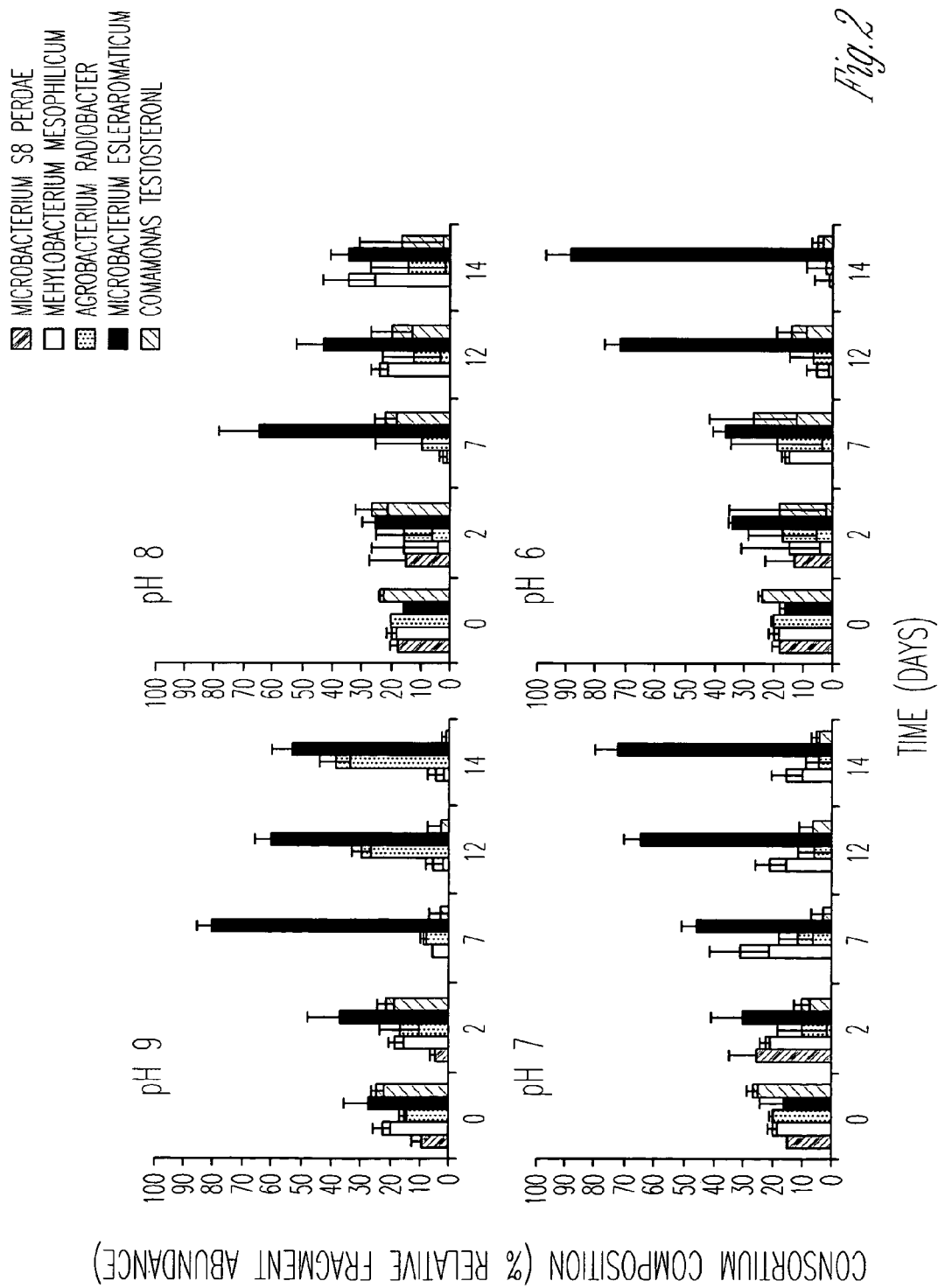
FIG. 2 shows bacterial consortium composition determined by length heterogeneity—PCR (expressed as % relative LH-PCR fragment abundance), within pH amended bioreactors over 14 days. (A) pH 9. (B) pH 8. (C) pH 7. (D) pH 6. Error bars represent standard deviation of the mean (n=3).

FIG. 2 shows bacterial consortium composition determined by length heterogeneity-PCR (expressed as % relative LH-PCR fragment abundance), within pH amended bioreactors over 14 days. Error bars represent standard deviation of the mean (n=3).

Only peaks corresponding to the consortium strains were detected throughout the study and no other peaks were detected from any of the abiotic pH bioreactors. After 7 days operation, *M. esteraromaticum* was found to be the most abundant population in all bioreactors regardless of pH.

Thus, it appears that the optimum pH is in the region of pH 6-7, and that it is advantageous to adjust MWF wastewater from pH 9 to between 6 and 7, to achieve optimal biological treatment.

These results were obtained over a period of 14 days in batch mode operation. The next step was to undergo extended bioreactor trials, under sequence batch mode operation, to assess the long-term fate and performance of the inoculum.

2b) Long Term Sequence Batch Suspension Studies.

MWF wastewater treatment studies were performed in an open 5 liter volume sequence batch bioreactor (approx. 14 day duration per batch sequence). pH was maintained at 6 throughout the bioreactor operation. At the start of each sequence, 4 l of treated effluent was pumped out and re-filled with untreated ultrafiltered Hysol X MWF. Air flow was maintained at 3.33 l min$^{-1}$ and temperature maintained at 28° C.±1° C. The individual strains were each incubated in 100 ml tryptic soy broth and 3% v/v fresh Hysol X MWF concentrate at 28° C. for 12 hours (cell counts=$10^7$ cells ml$^{-1}$). The cell suspensions were removed and resuspended in MWF wastewater, mixed together and added as a 10% v/v inoculum into the bioreactor.

Figure 3:
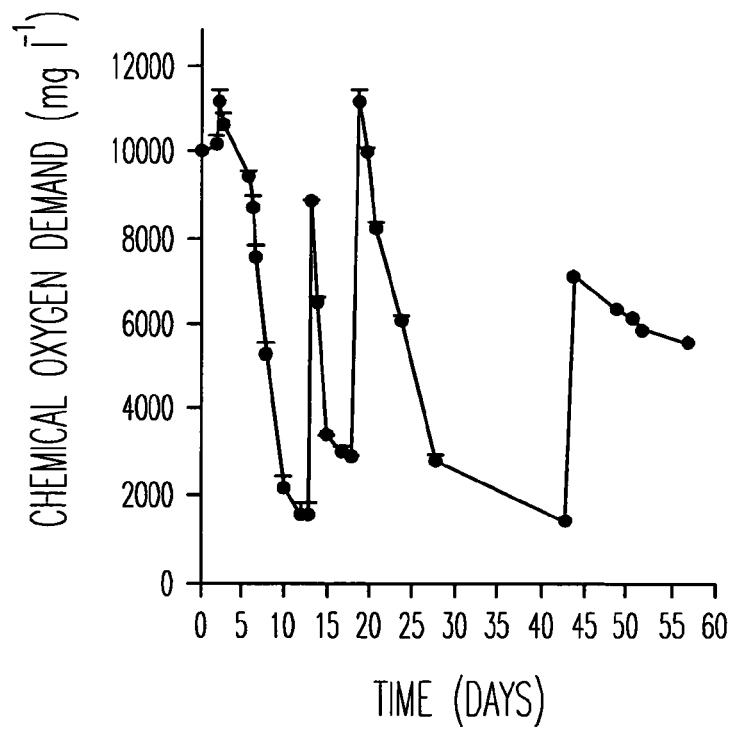
FIG. 3 shows reduction of pollution load (chemical oxygen demand) in the sequence batch reactor over 55 days operation. Error bars represent standard deviation of the mean (n=3).

Chemical oxygen demand (COD) within the reactor (FIG. 3) was reduced; in the 1st sequence (days 0 to 10) by 86%; 2nd sequence (days 11 to 17), 67%; 3rd sequence (days 18 to 43), 87%; and the 4th sequence (days 44-55), 21%. FIG. 3 shows reduction of pollution load (chemical oxygen demand) in the sequence batch reactor over 55 days operation. Error bars represent standard deviation of the mean (n=3).

Figure 4:
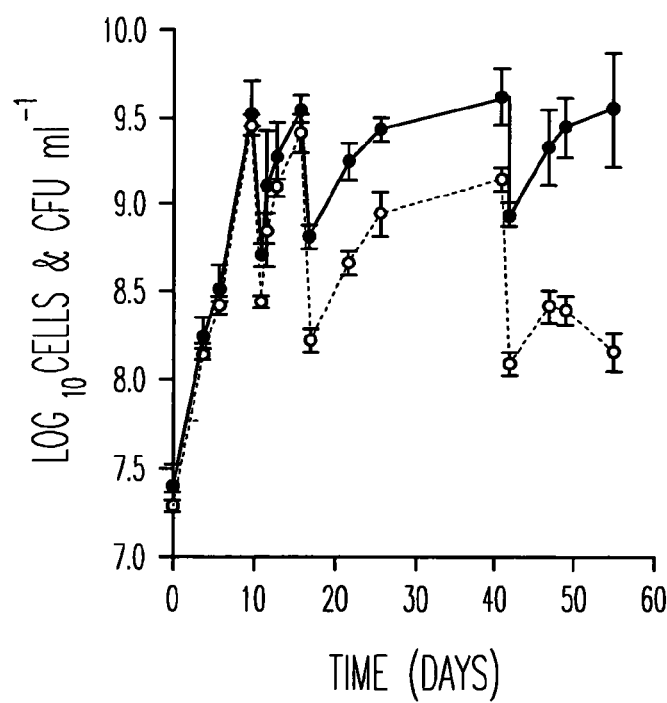
FIG. 4 shows total cell counts (black line) and colony forming units $ml^{-1}$ (dashed line) in the sequence batch reactor over 55 days operation. Error bars represent standard deviation of the mean (n=3).

Total cell counts and colony forming units ml$^{-1}$ (FIG. 4) correlated significantly (P<0.05) with COD, exhibiting a linear inverse relationship, suggesting bacterial abundance increased in response to decrease in pollution load. FIG. 4 shows total cell counts (black line) and colony forming units ml$^{-1}$ (dashed line) in the sequence batch reactor over 55 days operation. Error bars represent standard deviation of the mean (n=3).

Figure 5:
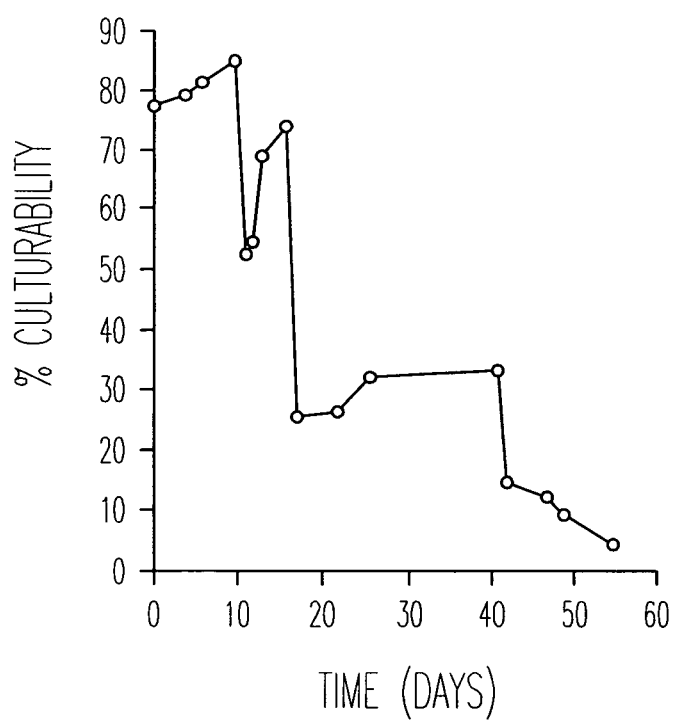
FIG. 5 shows percentage bacterial cell culturability within sequence batch reactor over 55 days operation.

Genotypic community fingerprinting by DGGE with cluster analyses of sample profiles throughout the 55 day bioreactor operation, revealed that the profiles were very similar (>85% similarity). Although the consortium could survive over long term operation a loss in degradative ability was observed which was reflected in both the decrease in COD reduction overtime (FIG. 3) and the decline in cell culturability (FIG. 5). FIG. 5 shows percentage bacterial cell culturability within sequence batch reactor over 55 days operation.

Cell culturability at day 0 was approximately 77% rising to 85% on day 10 (the end of the 1st batch sequence. From there on the percentage of culturability overall declined to 4% by day 55. Thus, the bacterial consortium could survive over the long term but lost its degradative ability under suspension conditions. Without being bound by theory, this may have been due to the sudden influx of fresh influent at the beginning of each batch sequence. In suspension, the cells were vulnerable to any perturbations such as spikes in the pollution load. However, biofilm communities have been well documented as being able to resist perturbations under conditions such as variation in temperature, pH or pollution load [16]. The next step was to determine whether the bacterial consortium in a fixed film (biofilm) trickle filter sequence batch reactor could reduce pollution load consistently over long term operation when exposed to three different types of MWF wastewater.

2c) Long Term Sequence Batch Fixed Film Studies Using Different MWF Wastewaters.

MWF wastewater treatment studies were performed in a 5 l sequence batch bioreactor (approx. 14 day duration per batch sequence) packed with corrugated plastic support matrix (length 2.5 cm, diameter 1.5 cm; WEBS Ltd, UK). At the start of each operational phase, 4.5 l of treated effluent was pumped out of the bioreactor and refilled with an equal volume of fresh MWF wastewater influent. The wastewater, contained within the bioreactor, was cycled through the system by a 313S Watson Marlow peristaltic pump (Watson Marlow, UK), via a spray distributor at a rate of 0.25 l min$^{-1}$. Air flow within the bioreactor was maintained at 3.3 l min$^{-1}$, using aquarium air pumps and air spargers (Fisher Scientific, UK). Bioreactor temperature was maintained at 28° C.±1° C., using water heated jackets. The consortium strains were inoculated as described above.

The reduction in pollution load was measured by chemical oxygen demand (COD) with an initial influent COD value, at the start of each operational phase, of approximately 6000 mg l$^{-1}$. The COD concentration was set to 6000 mg l$^{-1}$ as this is more representative of the waste MWF pollution load concentrations generated by automotive manufacturing plants. Three MWF wastewaters were employed in this study;
1) Hysol X as described previously, used in batch sequences 1 to 5 of this study.
2) A wastewater produced at an engine part manufacture plant (Bridgend, Wales) used in batch sequences 6 to 10.
3) A Mobil MWF wastewater used in batch sequences 11 to 15.

Figure 6:
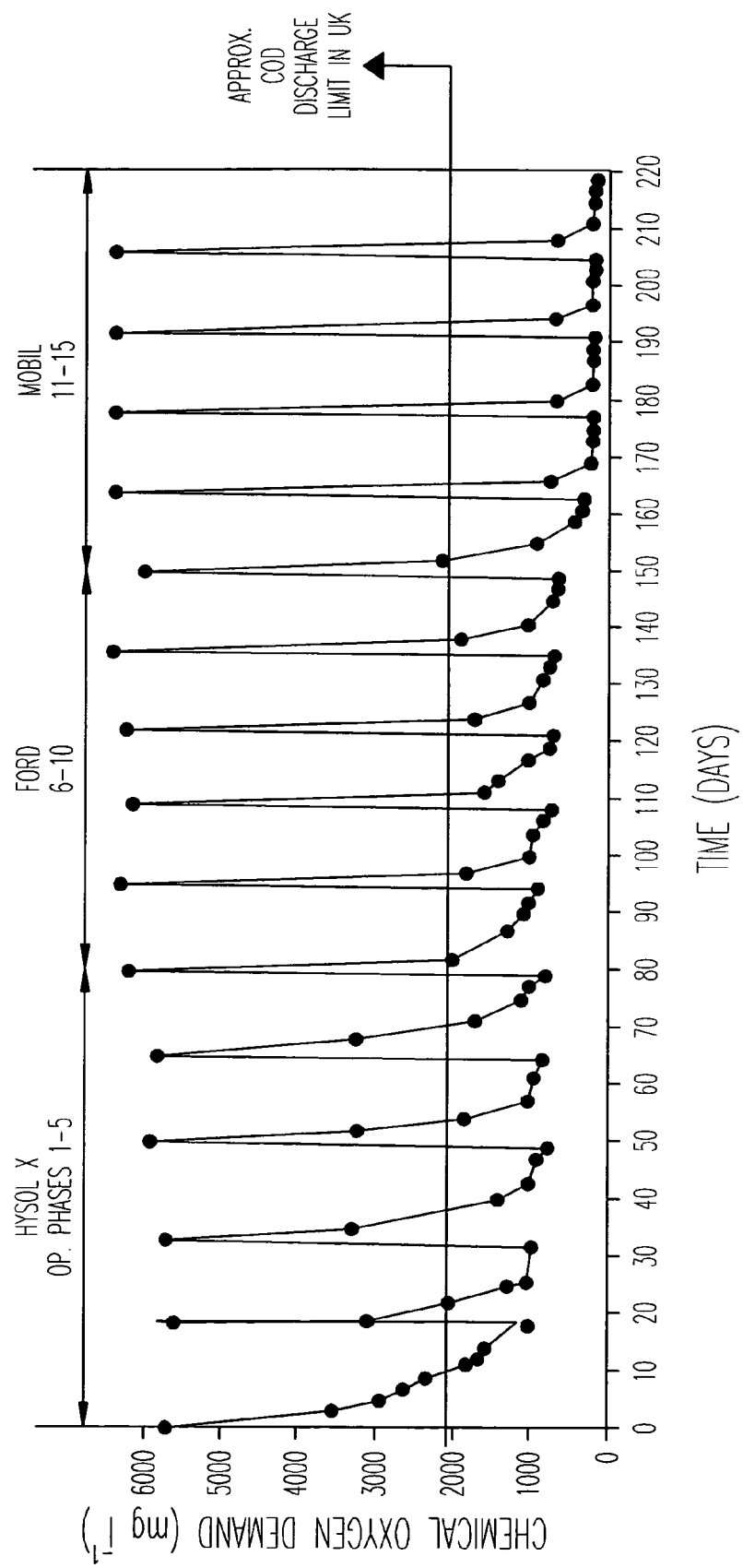
FIG. 6 shows reduction of chemical oxygen demand over time within the sequence batch fixed film bioreactor. Error bars represent standard deviation of the mean (n=3). Three separate fluid runs were used: phases 1 to 5, phases 6 to 10, and phases 11 to 15.

Over the first five batch sequences (days 0 to 79) pollution load was consistently reduced by 85%+2% (FIG. 6A). Pollution load of the Ford MWF wastewater was reduced in batch sequences 6 to 10 (days 80 to 149) by 87.8%±1.8%. In batch sequences 11 to 15 (days 150-219) the Mobil MWF wastewater COD was reduced by 96.4%±1.3%. Current acceptable COD limits for MWF wastewater discharge, set by UK water authorities, is approximately 2000 mg l'. This level was easily reached for all wastewaters, and the treated Hysol, Ford and Mobil MWF wastewaters from the bioreactor had final COD loadings of 906±102.4 mg l$^{-1}$, 754±97.2 mg l$^{-1}$, and 232.9±68.8 mg l$^{-1}$, respectively (FIG. 6). As COD decreased, so pH also dropped within each phase from 9.0 to 7.4 for the Hysol MWF wastewater phases; 9.5 to 8.0 for Ford wastewater; and 9.5 to 7.7 for the Mobil wastewater. FIG. 6B shows toxicity reducing with COD. An index of toxicity was derived as the reciprocal of the biosensor luminescence output expressed as a % of H2O control luminescence (i.e. the index of toxicity of the H20 control is 1/100%=0.01).

FIG. 6 shows reduction of chemical oxygen demand over time within the sequence batch fixed film bioreactor. Error bars represent standard deviation of the mean (n=3). Three separate fluid runs were used, and 6A indicates phase 1 to 5, 6B 6 to 10, and 6C 11 to 15.

Figure 7:
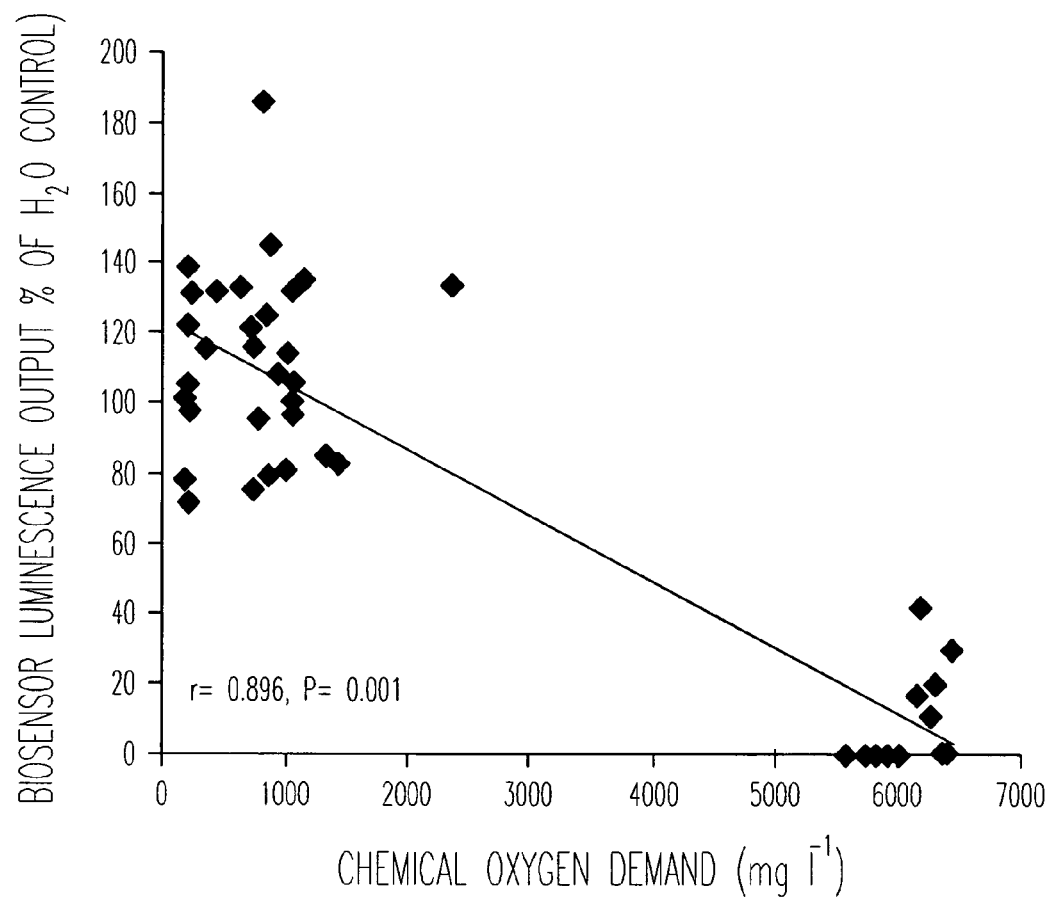
FIG. 7 shows the relationship between pollution load (COD) and effluent toxicity expressed as biosensor luminescence output. The relationship presented is significant at P<0.05. r=correlation coefficient.

Legislation concerning wastewater discharge may well be tightened further to include determination of effluent toxicity. Accordingly, the toxicity of the wastewaters being treated within the bioreactor was tested, using a commercially available biosensor, *Vibrio fischeri* and analyses were performed according to the manufacturer's instructions. When compared, the relationship between chemical oxygen demand and biosensor luminescence output (% of $H_2O$ control) exhibited a significant (P<0.05) linear inverse relationship (FIG. 7), suggesting as pollution load was reduced in the bioreactor system, effluent toxicity was also diminished. FIG. 7 shows the relationship between pollution load (COD) and effluent toxicity expressed as biosensor luminescence output. The relationship presented is significant at P<0.05. r=correlation coefficient.

Figure 8A:
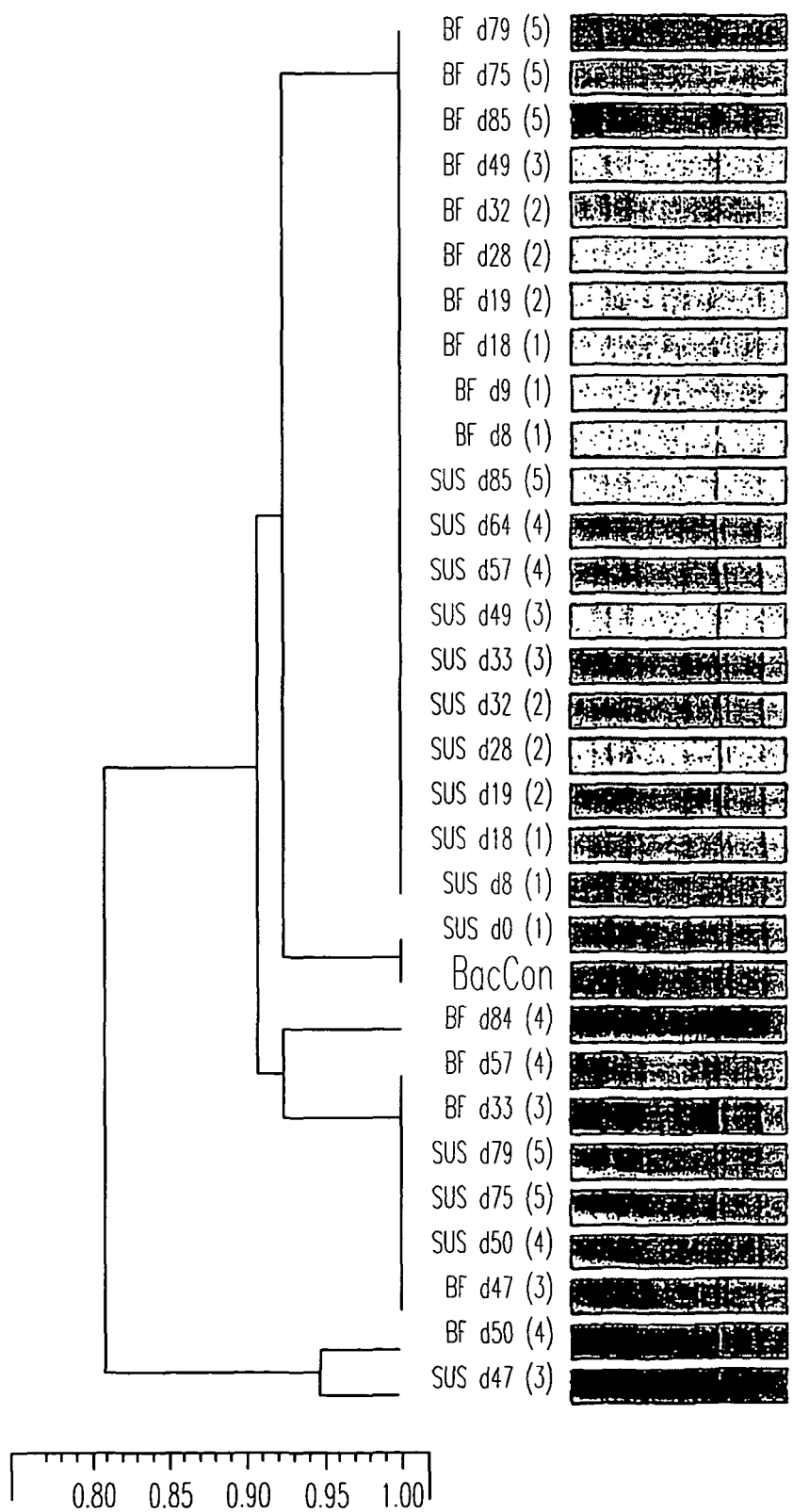
FIG. 8 shows UPGMA cluster analyses of biofilm and suspension sample DGGE profiles for (A) Hysol, (B) Ford and (C) Mobil wastewater sequence batch phases. Scale bars represent average distance between samples in each dendrogram. Samples are marked as follows: sample origin (BF—Biofilm or Sus—Suspension); day sampled; sequence batch phase in parentheses. A sample comprised of the five bacterial consortium strains (Bac Con) was used as a marker profile for each dendrogram.
Figure 8B:
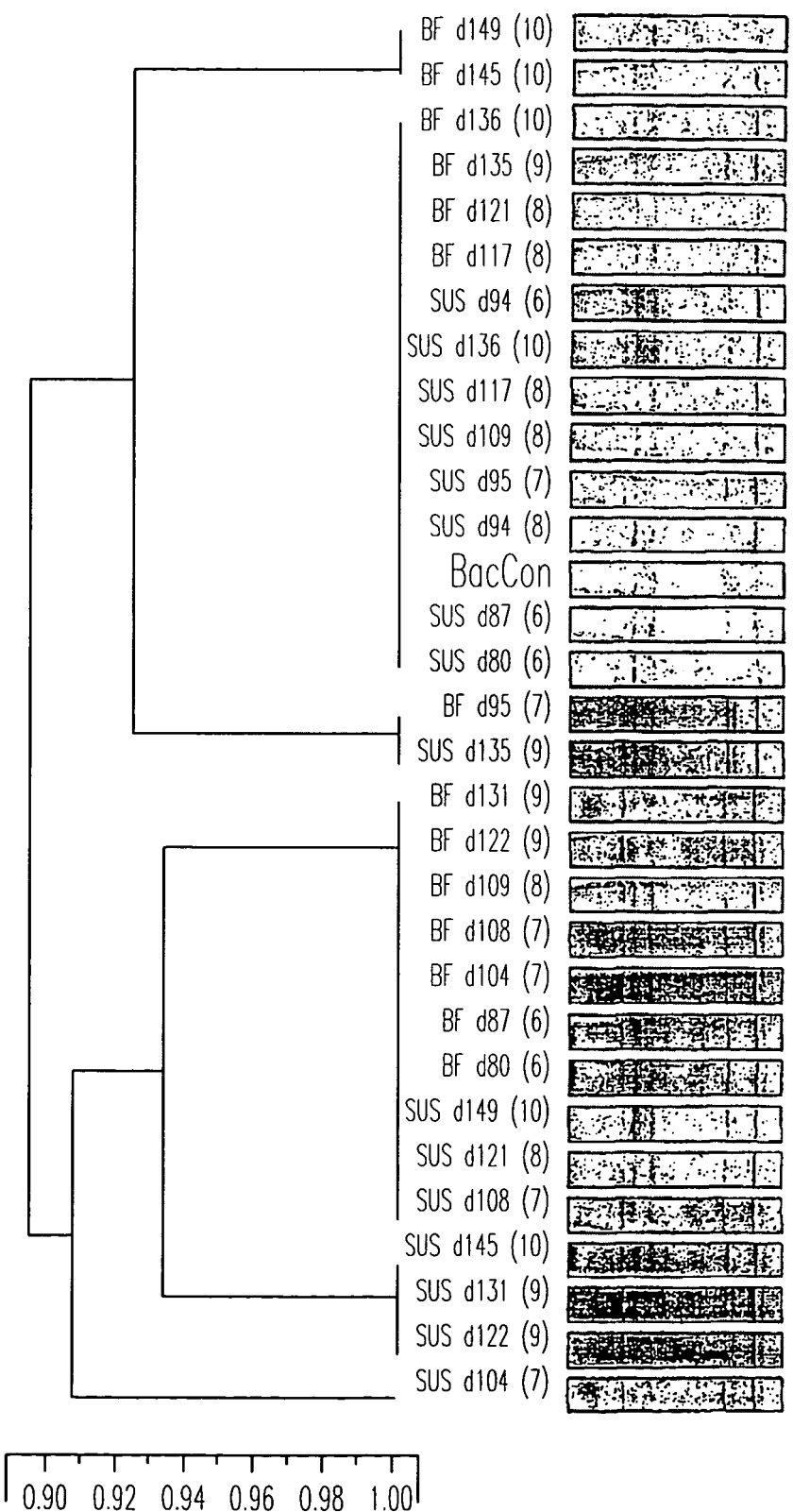
Figure 8C:
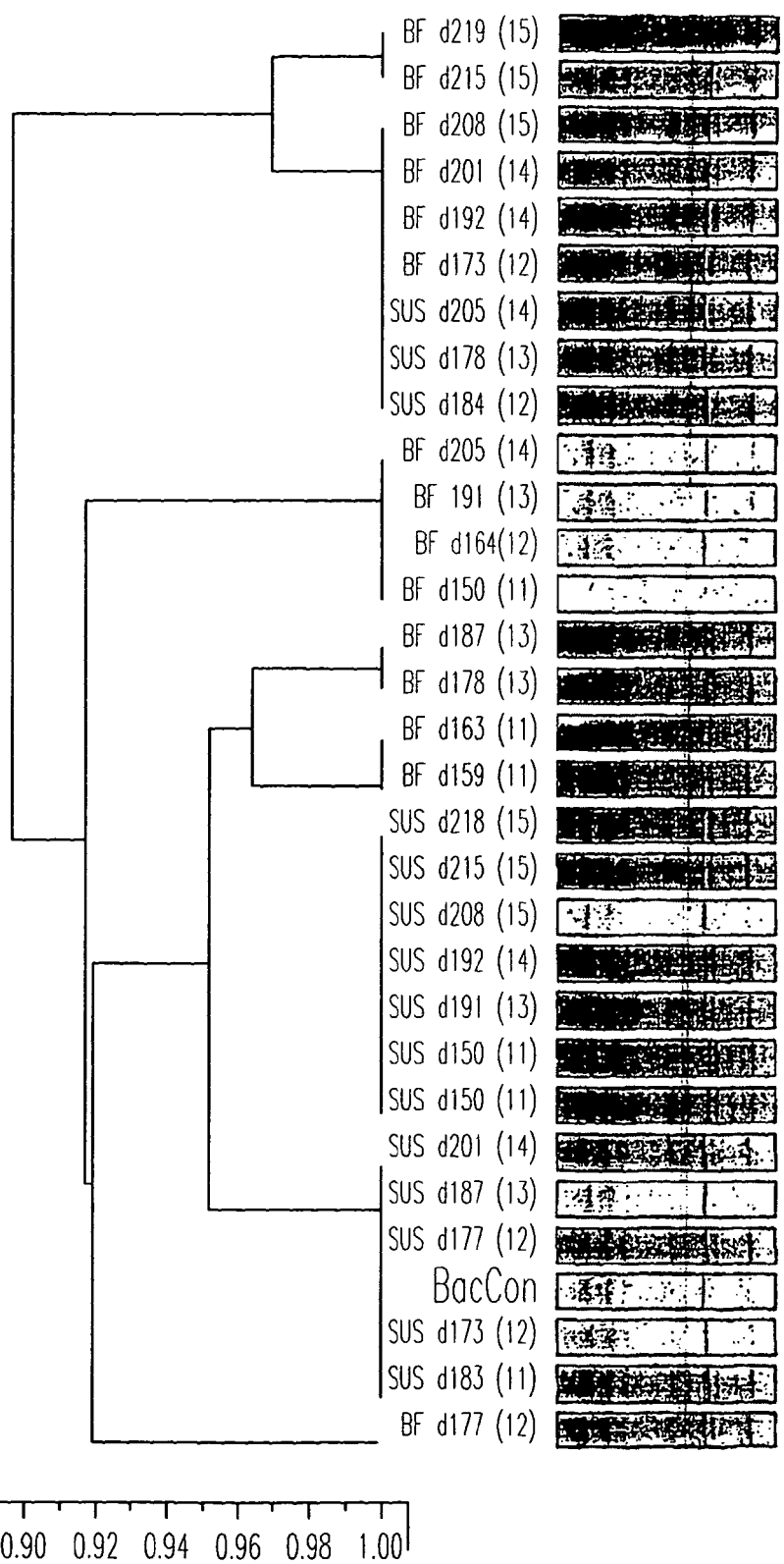

Genotypic profiling and subsequent cluster analysis was used to monitor the fate of the bacterial consortium within both the suspension and biofilm bioreactor habitats throughout the Hysol, Ford and Mobil wastewater sequence batch phase operation (FIG. 8). The bacterial consortium not only survived but was also dominant in the biofilm and suspension habitats throughout the 219 day study, as cluster analyses of sample DGGE profiles (including the bacterial consortium marker profiles) revealed >90% similarity, regardless of wastewater type. Variation (≤10%) in clustering could be due to colonisation of bacterial strains other than the consortium strains into the open bioreactor system. However, it was apparent, judging from analyses of the clusters, that these strains did not become established populations within either the biofilm or suspension habitats over the course of the whole study. FIG. 8 shows UPGMA cluster analyses of biofilm and suspension sample DGGE profiles for a) Hysol, b) Ford and c) Mobil wastewater sequence batch phases. Scale bars represent average distance between samples in each dendrogram. Samples are marked as follows: sample origin (BF—Biofilm or Sus—Suspension); day sampled; sequence batch phase in parentheses. A sample comprised of the five bacterial consortium strains (Bac Con) was used as a marker profile for each dendrogram.

3. Treatment of Whole Oil-Based MWF.

As detailed above, waste oil-based MWF are typically split into two fractions by physical-chemical treatment methods such as ultrafiltration (UF). Previously the high molecular weight oil-based fraction was sent to landfill, leaving the aqueous phase as a persistent wastewater problem. Further tightening of EU legislation and in particular the landfill of waste directive [17] means that the oil sludge from the UF step is now classified as hazardous waste in the UK and cannot be sent to landfill. Regardless of legislation, it is desirable not to have to send large quantities of waste to landfill sites if it is possible to otherwise dispose of the waste. Thus, the next step was to determine whether whole oil-based MWF could be treated by the bacterial consortium constructed to degrade aqueous MWF wastewaters.

Figure 9A:
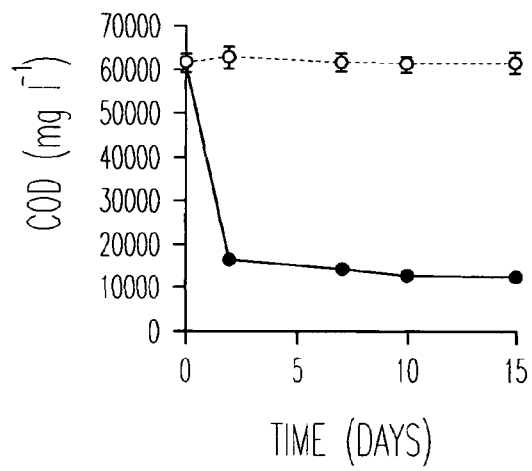
FIG. 9 shows the reduction of pollution load in batch suspension bioreactors from (A) high and (B) medium COD concentrations. Black line is the mean COD reduction from bioreactors inoculated with the bacterial consortium. Dashed lines show COD levels in control (abiotic) bioreactors. Error bars represent standard deviation of the mean (n=3).
Figure 9B:
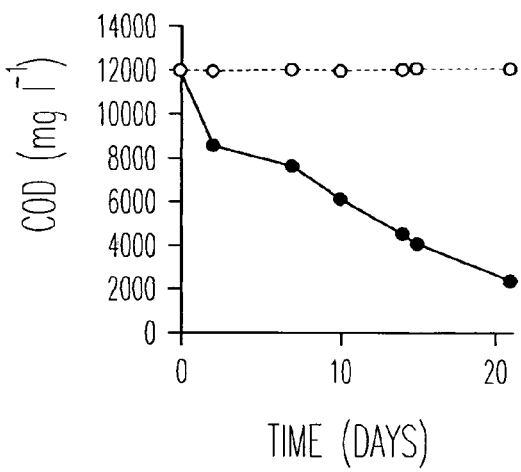

Using similar inoculation conditions as described above, the ability of the bacterial consortium to degrade high level COD oil-based MWF (Shell Dromus® B) was tested under suspension batch reactor conditions in 3 replicate bioreactors (FIG. 9a). With an initial COD of approx 62,000 mg $l^{-1}$ the pollution load was reduced by 80.3%. The treated MWF effluent (with a COD of approximately 12,000 mg $l^{-1}$) was then used for a second batch suspension study (FIG. 9b). Across the three replicate reactors the COD of the effluent was reduced by 80.1% to a final pollution load of circa 2363 mg $l^{-1}$. The control (no inoculum added to the MWF) remained constant over the course of the bioreactor runs (FIG. 9a & b). FIG. 9 shows the reduction of pollution load in batch suspension bioreactors from (A) high and (B) medium COD concentrations. Black line is the mean COD reduction from bioreactors inoculated with the bacterial consortium. Dashed lines show COD levels in control (abiotic) bioreactors. Error bars represent standard deviation of the mean (n=3).

In a further experiment, COD was reduced from almost 95,000 to below 2,000 in 8 days. The fluid was fresh semi-synthetic (worse case scenario) diluted to the starting COD level of 95,000, which is in excess of the average COD of raw spent metal working fluid (~50000-60000).

|        | Day      |         |          |          |      |
|--------|----------|---------|----------|----------|------|
|        | 0        | 2       | 5        | 7        | 8    |
| COD    | 94800    | 7512.667| 3246.667 | 2985.333 | 1834 |
| St dev | 2107.131 | 96.7178 | 74.144   | 56.4     | 85   |

Figure 10:
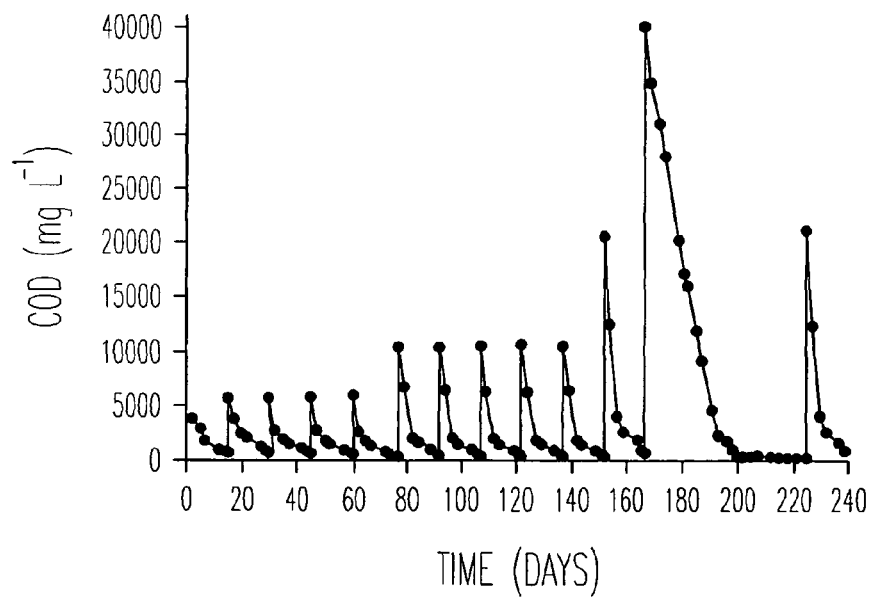
FIG. 10 shows the reduction of the chemical oxygen demand of oil-based MWF over time within a sequence batch fixed film bioreactor at varying pollution loadings (n=3).

A long term study, to ascertain the efficacy of the bacterial consortium in treating waste oil-based MWF (Shell Dromus® B) at different initial levels of COD, was initiated using a sequence-batch fixed film bioreactor (as described in 3c above). The MWF was initially started for 5 sequence batches at an initial pollution load of approximately 6000 mg $l^{-1}$ and COD was reduced to 567±103 mg $l^{-1}$ across the 5 operational phases (days 0 to 77) (FIG. 10[10A]). FIG. 10 shows the reduction of the chemical oxygen demand of oil-based MWF over time within a sequence batch fixed film bioreactor at varying pollution loadings. Error bars represent standard deviation of the mean (n=3).

For the next five operational phases the initial COD was raised to approximately 10,500 mg $l^{-1}$ and reductions of 96±0.2% were observed with excellent final COD concentrations of 431±17 mg $l^{-1}$ over the five phases (days 77 to 152). After this the reactor was subjected to contrasting initial COD concentrations to ascertain the bacterial consortium's ability to handle fluctuating (non-uniform) pollution loading.

The first operational phase (days 152 to 167) had a start COD of 20,500 mg $l^{-1}$ and was reduced by 96.5% to 727 mg $l^{-1}$. The second phase had a much higher COD loading of 40,000 mg $l^1$ and was reduced to 446 mg $l^{-1}$ (98.5% reduction) after 34 days (days 167 to 200). The third phase (days 200 to 225) had a negligible pollution loading of approximately 500 mg $l'$ COD which was reduced by over 54% to a final concentration of 206 mg $l^{-1}$. The fourth and final operational phase of the long-term bioreactor study (days 225 to 240) was started with an initial COD of 21,000 mg $l^{-1}$ and was reduced by 98.2% to a final pollution load of 373 mg $l^{-1}$ COD.

The most surprising observation was that the bacterial consortium, developed to degrade aqueous phase MWF wastewater, could consistently degrade whole oil-based fluids at different COD loadings to well within the UK COD discharge limit of 2000 mg $l^{-1}$.

4. Oil-Based-Shell Dromus
Deploying Bacterial Consortia

Bulk MWF biodegradation studies were performed in sealed bubble column bioreactors (5 l total volume) filled with plastic support matrix (consisting of hollow corrugated plastic 2.5 m long×1 cm diameter).

Each reactor was commissioned over a 4 week period prior to trialling, during which a biofilm of the bacterial consortium was allowed to establish on the biomedia, achieving a stable bacterial content of circa 10% of the bioreactor by volume. This was achieved by initially mixing separately cultured bacterial consortium with dilute (low COD) waste fluids, allowing the waste COD to be reduced to circa 1,000 mg/l, drawing off one third of the waste and adding more fluid in a series of cycles over the four weeks.

For each treatment, replicate bioreactors were established with a fourth reactor used as an abiotic control. All bioreactors were run under batch suspension conditions using working volumes of waste MWF of 4.5 l. Waste MWF was added to the bioreactor manually, by pouring in, and emptied by opening a tap at the bottom of the reactor. Air flow within the bioreactors was maintained at 3.3 l $\min^{-1}$, using aquarium air pumps and air spargers (Fisher Scientific, UK). Reactor temperature was maintained at 28° C.±1° C., using water-heated jackets.

The bioreactors were inoculated in the following way. The five strains were inoculated separately into 250 ml conical flasks containing 100 ml of tryptic soy broth (10% v/v. Difco, UK) and pre-filtered (using a 0.2 μm pore size filter, Millipore, UK) MWF wastewater (3% v/v). The individual cultures were incubated at 28° C. in an orbital shaker for 12 hours (cell counts approximated to $10^7$ cells $ml^{-1}$). The cell suspensions were mixed together and added as a 10% v/v (in TSB) inoculum into the bioreactors. Bacterial biofilms developed naturally on the support matrix by spontaneous growth thereon, provided that the supports were kept moist and preferably submerged.

5. Semi-Synthetic Degradation Study

Previously the biodegradative ability of the bacterial consortium (BC) has been tested against ultra-filtrated (UF), synthetic, and oil-based emulsion metal working fluids (MWF). As an extension to the previous research the BC was tested against whole semi-synthetic MWF. This allowed determination of whether the BC is effective at treating all types of MWF and whether it can treat high pollution load MWF, as determined by chemical oxygen demand (COD). Semi-synthetic MWF studies were performed in a 5 liter sequence batch bioreactors as described previously.

The semi-synthetic used was Hysol X® (Castrol) and was the whole fluid (not the ultrafiltrated (UF) variant). The synthetic fluid was Meqqem-cob® (Castrol). The starting COD was adjusted by altering the initial percentage concentration of the concentrated product at the start of each sequence batch phase, and was increased in order to establish how high a MWF COD the bacterial consortium could deal with. 50000 mg $l^{-1}$ COD for the fresh semi-synthetic was made up of 6% semi-synthetic MWF concentrate in water, and corresponds to the lower end of the manufacturer's usage recommendations. 107000 mg $l^{-1}$ was approx 12% semi-synthetic MWF concentrate in water. 6% to 12% MWF concentrate in water are the manufacturer's guide limits to make an operational MWF for that product (Hysol X® semi-synthetic MWF).

Figure 11:
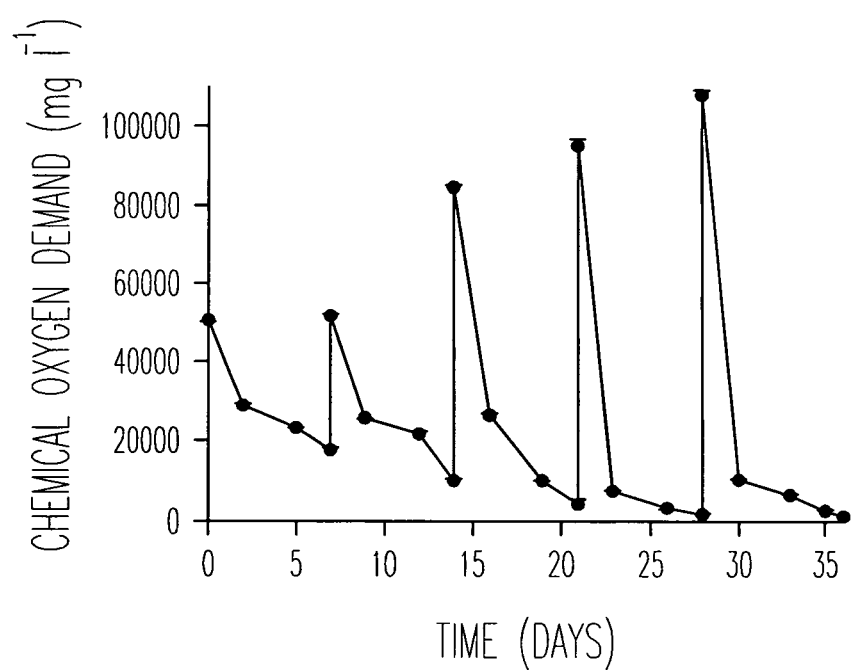
FIG. 11 shows the reduction of chemical oxygen demand over time within the sequence batch fixed film bioreactor. Error bars represent standard deviation of the mean (n=3).

From a start COD of 50233 mg $L^{-1}$, pollution load was reduced by 64.9%±1.2% within the first batch phase (days 0 to 7) (FIG. 11). For the second phase (days 7 to 14) the start COD was 51,733 mg $L^{-1}$ and pollution load was reduced by 80.1%±0.9%. Third phase (days 14 to 21) start COD was 84,067 mg $L^{-1}$ with a reduction of 95.1%±0.1%. For the fourth (days 21-28) and fifth (days 28 to 36) phases the start COD loading was 94,800 and 107,933 mg $L^{-1}$, respectively. The final reduction in COD for phase 4 & 5 was 98.1%±0.1% and 99.0%±0.01% respectively.

FIG. 11 shows the reduction of chemical oxygen demand over time within the sequence batch fixed film bioreactor. Error bars represent standard deviation of the mean (n=3).

This study demonstrates that the bacterial consortium can degrade all types of MWF. In addition, it shows that the bacterial consortium can degrade MWF at high chemical oxygen demands, in excess of 50,000 mg $L^{-1}$.

6. Deconstruction of the Bacterial Consortium

The aim of this study was to ascertain whether all five strains of the bacterial consortium are essential to its overall biodegradative ability. This was achieved by testing the bacterial consortium's biodegradative ability against a synthetic MWF and a semi-synthetic MWF under batch suspension conditions. Using a factorial design, bacterial strains were subsequently removed until the degradative performance was significantly worse than the whole bacterial consortium.

Figure 12A:
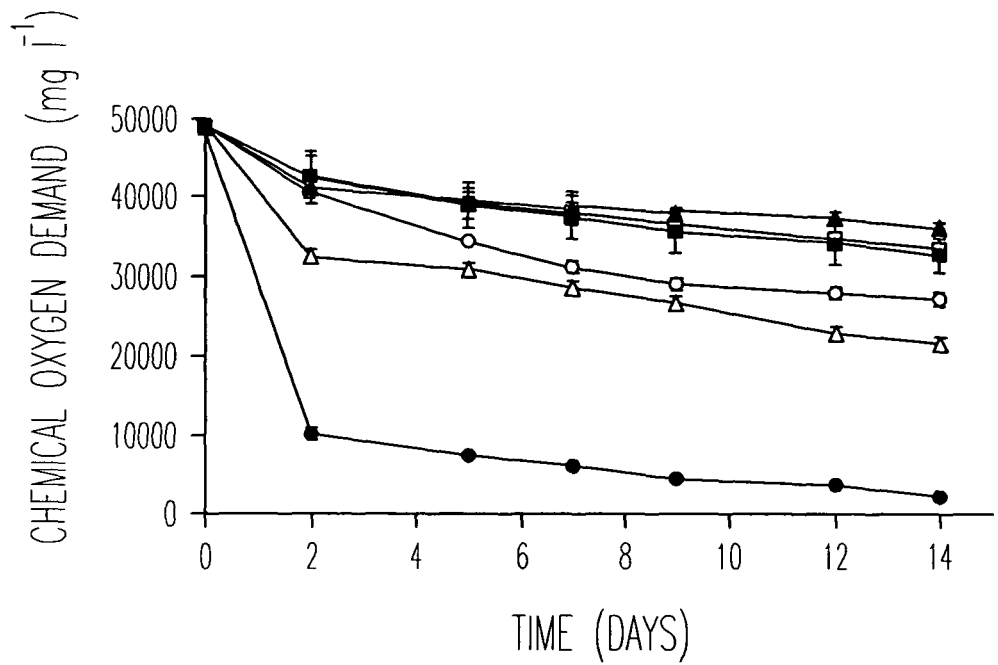
FIG. 12 shows the performance of the bacterial consortium, with and without removal of individual strains, to degrade (A) synthetic and (B) semi-synthetic MWF. Solid circles represent the bacterial consortium (BC); open circles are BC without *Comamonas testosteroni*; closed triangles are BC without *Agrobacterium radiobacter*; open triangles are *Methylobacterium mesophilicum*; open squares are *Microbacterium saperdae*; clsoed squares are *Microbacterium esteraromaticum*. Error bars represent standard deviation of the mean (n=3).
Figure 12B:
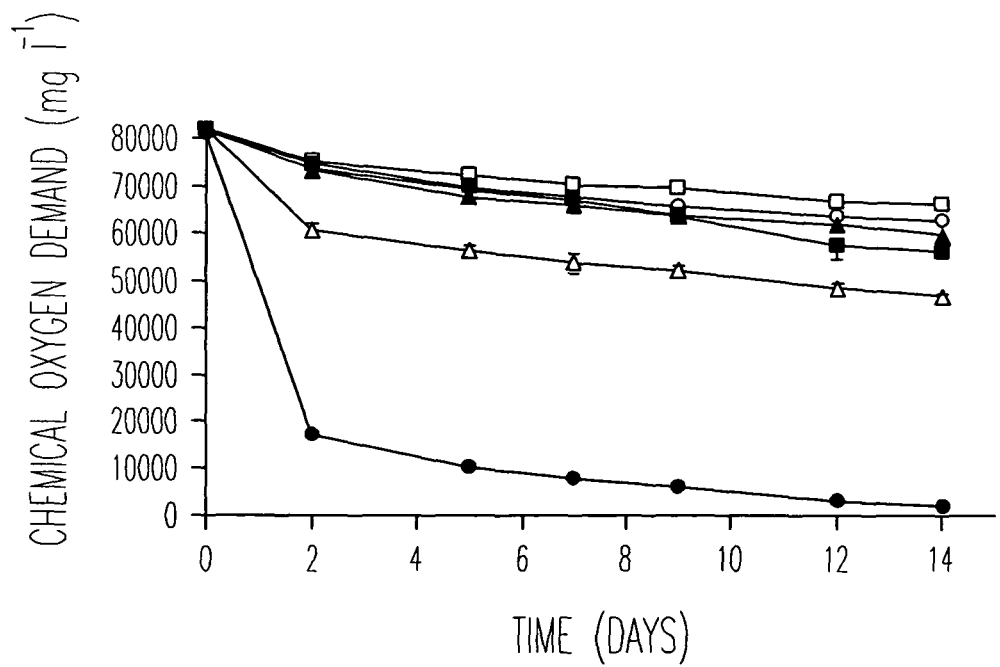

FIG. 12 shows the performance of the bacterial consortium, with and without removal of individual strains, to degrade (A) synthetic and (B) semi-synthetic MWF. Solid circles represent the bacterial consortium (BC); open circles are BC without *Comamonas testosterone*; closed triangles are BC without *Agrobacterium radiobacter*; open triangles are *Methylobacterium mesophilicum*; open squares are *Microbacterium saperdae*; closed squares are *Microbacterium esteraromaticum*. Error bars represent standard deviation of the mean (n=3).

Removal of any of the bacterial consortium strains reduces the biodegradative performance (FIGS. 12 A & B). Furthermore, reduction of COD following the removal of any given bacterial consortium strain is adversely affected but is still present.

In this and the following Example, the BC and randomly selected and constructed BCs were tested against a synthetic MWF (Meqqem-cob® [Castrol]) and a semi-synthetic (Hysol X® [Castrol]). Each condition was replicated (n=3). The experiments where carried out under batch suspension conditions with an initial inocula concentration of 10% volume per volume (v/v). Other conditions are as described in previous Examples.

7. Effect of Variation of Strain

The aim of this study was to ascertain whether the success of the bacterial consortium is strain specific to those constituent species or whether randomly constructed consortia of the same species but different strain can perform the same or better. Biodegradation trials where performed using both synthetic and semi-synthetic MWF under batch suspension conditions. The bacterial consortium was tested against three randomly constructed bacterial consortia (Table 1).

TABLE 1

Strains for the bacterial consortium (BC) and the three randomly constructed consortia (Random BCa, b and c).

| Species | Bacterial consortium | Random BCa | Random BCb | Random BCc |
|---|---|---|---|---|
| *Microbacterium esteraromaticum* | 15-BTZ-N | 15-TEA-K | 15-CA-G | 20-BA-B |
| *Microbacterium saperdae* | 1-TEA-C | 1-MEA-N | 1-TEA-J | 1-CA-F |
| *Comamonas testosteroni* | 1-BTZ-O | 1-CA-C | 20-MEA-J | 15-MEA-C |
| *Methylobacterium mesophilicum* | 20-BTZ-N | 20-BTZ-A | 5-BTZ-A | 1-CA-A |
| *Agrobacterium radiobacter* | 5-BA-A | 5-BA-I | 20-BA-G | 1-BTZ-A |

Figure 13A:
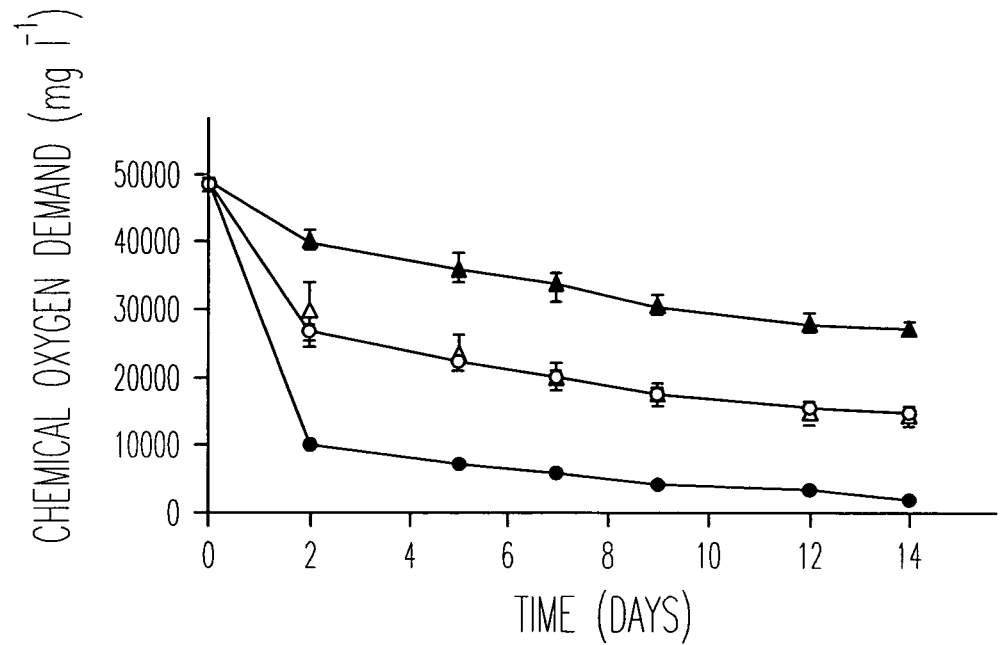
FIG. 13, shows the performance of the bacterial consortium BC (solid circles), compared against the three randomly constructed consortia: rBCa (open triangles), rBCb (closed triangles), rBCc (open circles), when tested against (A) synthetic and (B) semi-synthetic MWF. Error bars represent the standard deviation of the mean (n=3).
Figure 13B:
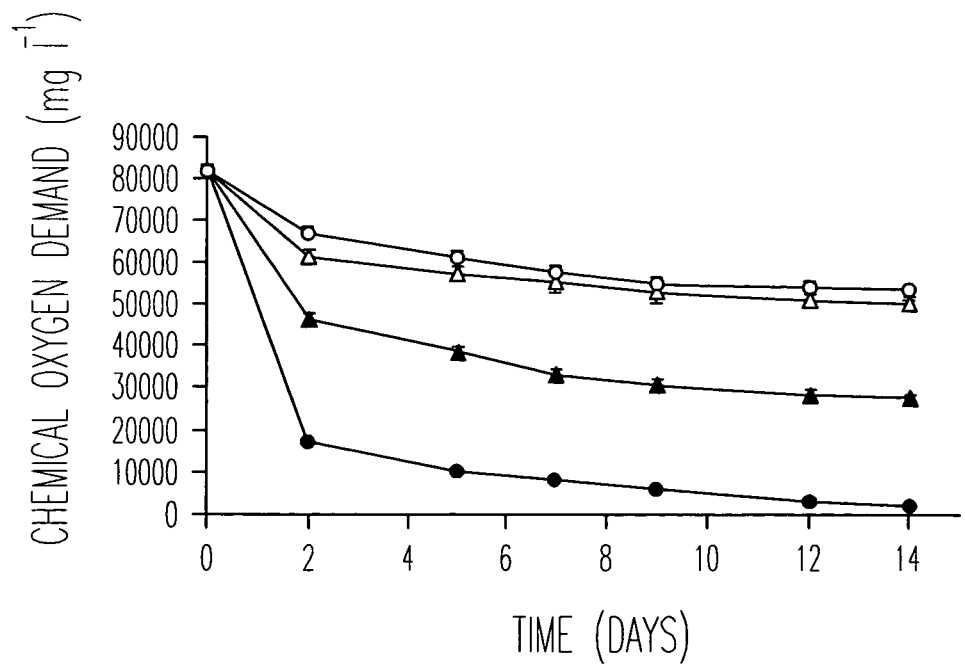

Results are shown in FIG. 13, showing the performance of the bacterial consortium BC (solid circles), compared against the three randomly constructed consortia: rBCa (open triangles), rBCb (closed triangles), rBCc (open circles), when tested against (A) synthetic and (B) semi-synthetic MWF. Error bars represent the standard deviation of the mean (n=3).

The reduction of COD by the bacterial consortium for the synthetic and semi-synthetic MWF was 95.9±0.3% and 97.6±0.2%, respectively. For rBCa, 70.7±2.7% and 38.3±0.5%; rBCb 44.1±2.0% and 66.2±0.9%; and rBCc 39.7±2.1% and 34.8±1.8%. The reduction of COD by the bacterial consortium was significantly higher than the randomly constructed bacterial consortia (ANOVA P<0.0001 in all cases).

This shows that varying all strains, while reducing efficacy, retains the ability to degrade MWF.

REFERENCES

1. Bio-Wise, *A guide to biological treatment for metalworking fluids disposal*. 2000, Department of Trade and Industry.
2. Enviro-Wise, *Optimising the use of metalworking fluids*. 1999, Department of Trade and Industry.
3. *Effluent limitations guidelines, pretreatment standards, and new source performance standards: Metal products and machinery; Proposed rule*, in 40 *CFR Parts* 433, 438 and 464. 1995, Federal Register.
4. *Effluent limitations guidelines, pretreatment standards, and new source performance standards for the metal products and machinery point source category: Proposed rule*, in 40 *CFR Parts* 413, 433, 438, 463, 464, 467 and 471. 2001, Federal Register.
5. European-Commission, *Council Directive 2000/60/EC of the European Parliament and of the Council of 23 Oct. 2000 establishing a framework for Community action in the field of water policy. Official journal of the European Communities no. L327 of 22 Dec. 2000*. 2000: Office for official publications of the European Communities, L-2985 Luxembourg.

6. European-Commission, *Directive 2000/76/EC of the European Parliament and of the Council of 4 Dec. 2000 on the incineration of waste. Official Journal oft the European Communities, L332 of 28 Dec.* 2000. 2000: Office for official publications of the European Communities, L-2985 Luxembourg.
7. Wagner-Döbler, I., *Microbial inoculants: Snake oil or Panacea?*, in *Bioremediation: A critical review*, I. M. Head, I. Singleton, and M. G. Milner, Editors. 2003, Horizon Scientific Press Wymondham, Norfolk. p. 259-289.
8. Beaulieu, M., et al., *Evolution of bacterial diversity during enrichment of PCP-degrading activated soils.* Microbial Ecol, 2000. 40: 345-355.
9. Elvang, A. M., et al., *Use of green fluorescent protein and luciferase biomarkers to monitor survival and activity of Arthrobacter chlorophenolicus A6 cells during degradation of 4-chlorophenol in soil.* Environ Microbiol, 2001. 3: 32-42.
10. Stucki, G. and M. Thuer, *Experiences of a large-scale application of 1,2-dichloroethane degrading micro-organisms for groundwater treatment.* Environ Sci Technol, 1995. 29: 2339-2345.
11. Wagner-Döbler, I., et al., *Removal of mercury from chemical wastewater by micro-organisms in technical scale.* Environ Sci Technol, 2000. 2: 4628-4634.
12. van der Gast, C. J., et al., *Bioaugmentation strategies for remediating mixed chemical effluents.* Biotechnol Prog, 2003. 19:1156-1161.
13. Graham, D. W. and T. P. Curtis, *Ecological theory and bioremediation*, in *Bioremediation: A critical review*, I. M. Head, I. Singleton, and M. G. Milner, Editors. 2003, Horizon Scientific Press: Wymondham, Norfolk. p. 61-92.
14. van der Gast, C. J., et al., *Selection of microbial consortia for treating metal working fluids.* J Ind Microbiol Biotechnol, 2002. 29: 20-27.
15. van der Gast, C. J., et al., *Bacterial community structure and function in a metal-working fluid.* Environ Microbiol, 2003. 5: 453-461.
16. Davies, D., *Understanding biofim resistance to antimicrobial agents.* Nat Rev Drug Discov, 2003. 2:114-122.
17. European-Commission, *Council Directive 1999/31/EC of the European Parliament and of the Council of 26 Apr. 1999 on the landfill of waste. Official journal of the European Communities no. L182 of 16 Jul. 1999.* 1999: Office for official publications of the European Communities, L-2985 Luxembourg.

The invention claimed is:

1. A method for reducing the chemical oxygen demand of a metal working fluid, comprising contacting the metal working fluid with a biofilm within a bioreactor wherein the biofilm is composed of a consortium of *Agrobacterium radiobacter, Comamonas testosteroni, Methylobacterium mesophilicum, Microbacterium esteraromaticum*, and *Microbacterium saperdae*, and the biofilm has been formed within the bioreactor prior to said contacting with the metal working fluid, wherein at least four members of the biofilm are identified as *Agrobacterium, Comamonas, Methylobacterium*, or *Microbacterium* by culture dependent fatty acid methyl ester (FAME) analysis.

2. A method according to claim 1, wherein the spent metal working fluid is unprocessed prior to contact with said biofilm.

3. A method according to claim 1, wherein the biofilm is capable of reducing a chemical oxygen demand of 50000 mg $l^{-1}$ or higher in said spent metal working fluids to 2000 mg $l^{-1}$ or lower in 7 days or less.

4. A method according to claim 1, wherein the biofilm is capable of reducing a chemical oxygen demand of 50000 mg $l^{-1}$ or higher in said spent metal working fluids to 2000 mg $l^{-1}$ or lower in 2 days or less.

5. A method according to claim 1, wherein the biofilm has *Agrobacterium radiobacter* (NCIMB 41462 (5-BA-A), *Comamonas testosteroni* (NCIMB 41463 (1-BTZ-0)), *Methylobacterium mesophilicum* (NCIMB 41464 (20-BTZ-N)), *Microbacterium esteraromaticum* (NCIMB 41465 (15-BTZ-N)) and *Microbacterium saperdae* (NCIMB 41466 (1-TEA-C)) as its members.

6. A method according to claim 1, operated at temperatures of between 10 and 30° C.

7. A bioreactor suitable for reducing the chemical oxygen demand of spent metal working fluids, the bioreactor comprising a biofilm composed of a consortium of *Agrobacterium radiobacter, Comamonas testosteroni, Methylobacterium mesophilicum, Microbacterium esteraromaticum*, and *Microbacterium saperdae* that is contacted with spent metal working fluids, wherein at least four members of the biofilm are identified as *Agrobacterium, Comamonas, Methylobacterium*, or *Microbacterium* by culture dependent fatty acid methyl ester (FAME) analysis.

8. A bioreactor in accordance with claim 7, for the treatment of unprocessed, spent metal working fluids.

9. A bioreactor according to claim 7, comprising a reservoir to hold metal working fluid in contact with said biofilm.

10. A bioreactor according to claim 7, adapted for continuous throughput of spent metal working fluid.

11. A bioreactor according to claim 7, wherein the biofilm comprises *Agrobacterium radiobacter* (NCIMB 41462 (5-BA-A), *Comamonas testosteroni* (NCIMB 41463 (1-BTZ-0)), *Methylobacterium mesophilicum* (NCIMB 41464 (20-BTZ-N)), *Microbacterium esteraromaticum* (NCIMB 41465 (15-BTZ-N)) and *Microbacterium saperdae* (NCIMB 41466 (1-TEA-C)) as its members.

12. An apparatus comprising a bioreactor suitable for reducing the chemical oxygen demand of spent metal working fluids, the bioreactor comprising a biofilm composed of a consortium of *Agrobacterium radiobacter, Comamonas testosteroni, Methylobacterium mesophilicum, Microbacterium esteraromaticum*, and *Microbacterium saperdae* that is contacted with spent metal working fluids, wherein at least four members of the biofilm are identified as *Agrobacterium, Comamonas, Methylobacterium*, or *Microbacterium* by culture dependent fatty acid methyl ester (FAME) analysis.

13. A method according to claim 1, wherein said spent metal working fluid is a synthetic metal working fluid.

14. A method according to claim 1, wherein said spent metal working fluid is a semi-synthetic metal working fluid.

15. A method according to claim 1, wherein said spent metal working fluid is an oil-based metal working fluid.

* * * * *